US010078898B2

(12) United States Patent
Gordon

(10) Patent No.: US 10,078,898 B2
(45) Date of Patent: Sep. 18, 2018

(54) NONCONTACT METROLOGY PROBE, PROCESS FOR MAKING AND USING SAME

(71) Applicant: NATIONAL INSTITUTE OF STANDARDS AND TECHNOLOGY, Gaithersburg, MD (US)

(72) Inventor: Joshua Gordon, Lafayette, CO (US)

(73) Assignee: NATIONAL INSTITUTE OF STANDARDS AND TECHNOLOGY, Gaithersburg, MD (US)

( * ) Notice: Subject to any disclaimer, the term of this patent is extended or adjusted under 35 U.S.C. 154(b) by 297 days.

(21) Appl. No.: 14/930,685

(22) Filed: Nov. 3, 2015

(65) Prior Publication Data

US 2016/0071272 A1    Mar. 10, 2016

Related U.S. Application Data

(60) Provisional application No. 62/076,529, filed on Nov. 7, 2014.

(51) Int. Cl.
*G06T 7/00* (2017.01)
*G01B 21/04* (2006.01)
*G01B 11/245* (2006.01)
*G06T 7/80* (2017.01)

(52) U.S. Cl.
CPC .......... *G06T 7/0018* (2013.01); *G01B 11/245* (2013.01); *G01B 21/042* (2013.01); *G06T 7/80* (2017.01); *G06T 2207/20088* (2013.01); *G06T 2207/30204* (2013.01)

(58) Field of Classification Search
CPC .................................................... G06T 7/0018

USPC ........................................................ 356/611
See application file for complete search history.

(56) References Cited

U.S. PATENT DOCUMENTS

| 5,563,991 A | 10/1996 | Mahoney | |
|---|---|---|---|
| 8,723,789 B1 * | 5/2014 | Rafii | G06F 3/017 345/156 |
| 8,892,252 B1 * | 11/2014 | Troy | G01B 11/14 700/213 |

(Continued)

*Primary Examiner* — Tarifur Chowdhury
*Assistant Examiner* — Omar Nixon
(74) *Attorney, Agent, or Firm* — Office of Chief Counsel for National Institute of Standards and Technology

(57) ABSTRACT

Disclosed is a noncontact metrology probe including: a first camera including a first field of view; a second camera including a second field of view and arranged such that the second field of view overlaps the first field of view to form a prime focal volume; a third camera including a third field of view and arranged such that the third field of view overlaps the prime focal volume to form a probe focal volume; and a tracker including a tracker field of view to determine a location of the probe focal volume in the tracker field of view. Further disclosed is a process for calibrating a noncontact metrology probe, the process including: providing a noncontact metrology probe including: a first camera including a first field of view; a second camera including a second field of view; a third camera including a third field of view; and a tracker including a tracker field of view; overlapping the first field of view with the second field of view to form a prime focal volume; overlapping the prime focal volume with the third field of view to form a probe focal volume; and overlapping the a tracker field of view with the probe focal volume to calibrate the noncontact metrology probe.

22 Claims, 26 Drawing Sheets

(56) References Cited

U.S. PATENT DOCUMENTS

| | | | | |
|---|---|---|---|---|
| 2003/0090682 A1* | 5/2003 | Gooch | ............... | G01B 11/002 356/620 |
| 2003/0123703 A1* | 7/2003 | Pavlidis | ............ | G06K 9/00335 382/103 |
| 2007/0279494 A1* | 12/2007 | Aman | .................. | G01S 3/7864 348/169 |
| 2010/0001997 A1* | 1/2010 | Kajikawa | ............... | G06T 17/20 345/419 |
| 2010/0166260 A1* | 7/2010 | Huang | .............. | G06K 9/00771 382/103 |
| 2012/0051598 A1* | 3/2012 | Ikeda | ................. | G01B 11/002 382/103 |
| 2014/0362219 A1* | 12/2014 | Seger | ................... | G03B 29/00 348/148 |

* cited by examiner

NONCONTACT METROLOGY PROBE, PROCESS FOR MAKING AND USING SAME

CROSS REFERENCE TO RELATED APPLICATIONS

This application claims the benefit of U.S. Provisional Patent Application Ser. No. 62/076,529 filed Nov. 7, 2014, the disclosure of which is incorporated herein by reference in its entirety.

STATEMENT REGARDING FEDERALLY SPONSORED RESEARCH

This invention was made with United States government support from the National Institute of Standards and Technology. The government has certain rights in the invention.

BRIEF DESCRIPTION

Disclosed is a noncontact metrology probe comprising: a first camera comprising a first field of view; a second camera comprising a second field of view and arranged such that the second field of view overlaps the first field of view to form a prime focal volume; a third camera comprising a third field of view and arranged such that the third field of view overlaps the prime focal volume to form a probe focal volume; and a tracker comprising a tracker field of view to determine a location of the probe focal volume in the tracker field of view.

Further disclosed is a process for calibrating a noncontact metrology probe, the process comprising: providing a noncontact metrology probe comprising: a first camera comprising a first field of view; a second camera comprising a second field of view; a third camera comprising a third field of view; and a tracker comprising a tracker field of view; overlapping the first field of view with the second field of view to form a prime focal volume; overlapping the prime focal volume with the third field of view to form a probe focal volume; and overlapping the a tracker field of view with the probe focal volume to calibrate the noncontact metrology probe.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

It has been discovered that a noncontact metrology probe described herein has advantageous and unexpectedly high spatial resolution. Further, the noncontact metrology probe provides a probe focal volume in space that is coincident with a reference member. The probe focal volume accordingly provides acquisition of spatial information, e.g., location, size, and the like, of an object member that can be referenced to a coordinate frame of a tracker.

Figure 6:
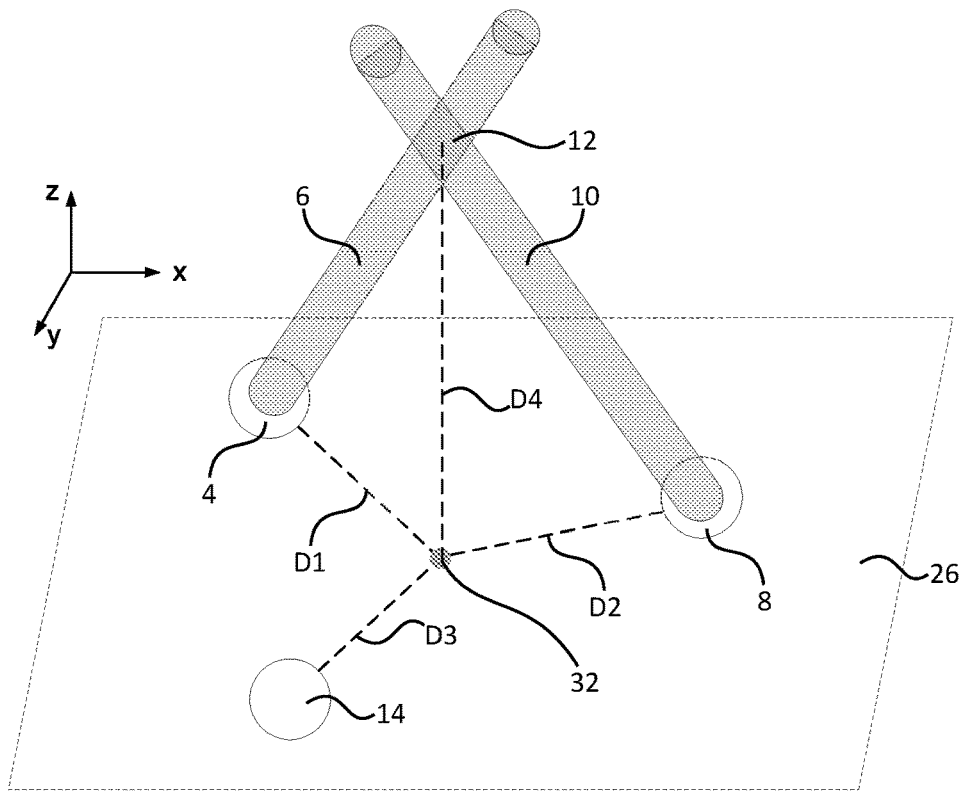
FIG. 6 shows a first field of view, a second field of view, and a prime focal volume for cameras shown in FIG. 3.
Figure 7:
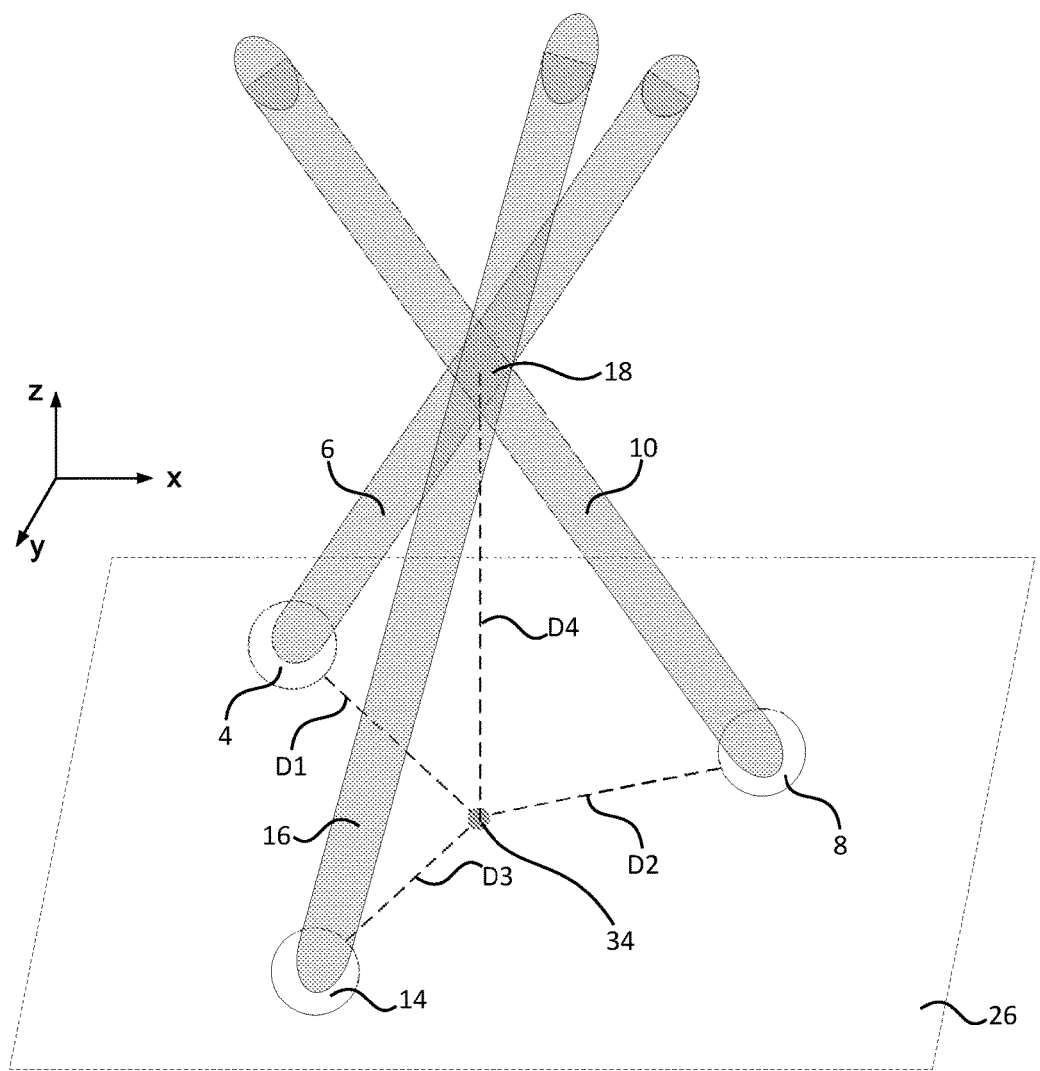
FIG. 7 shows a first field of view, a second field of view, a third field of view, and a probe focal volume for cameras shown in FIG. 3.

In an embodiment, with reference to FIG. 1, FIG. 2, FIG. 3, FIG. 4, FIG. 5, FIG. 6, FIG. 7, FIG. 8, and FIG. 9, noncontact metrology probe 2 includes a plurality of cameras (e.g., first camera 4, second camera 8, third camera 14), optionally reference member 28 disposed proximate to cameras (4, 8, 14), and tracker 20. Here, first camera 4 includes first field of view 6, and second camera 8 includes second field of view 10. First camera 4 and second camera 8 are arranged such that second field of view 10 overlaps first field of view 6 to form prime focal volume 12 as shown in FIG. 6. Additionally, third camera 14 includes third field of view 16, wherein third field of view 16 overlaps prime focal volume 12 to form probe focal volume 18 as shown in FIG. 7. Moreover, tracker 20 includes tracker field of view 22 to determine a location of probe focal volume 18 in tracker field of view 22.

First camera 4, second camera 8, and third camera 14 are disposed in a planar configuration in plane 26. Reference member 28 produces projection 30 on plane 26 at a minimum separation between reference member 28 and plane 26 of distance D4. First camera 4, second camera 8, and third camera 14 respectively are separated from projection 30 in plane 26 by distances D1, D2, and D3. First camera 4 and second camera 8 are arranged at angle A; second camera 8 and third camera 14 arranged at angle B, and first camera four and third camera 14 are arranged at angle C.

In some embodiments, first camera 4, second camera 8, and third camera 14 are disposed at vertices of a tetrahedral with respect to reference member 28 such that first camera 4 is located at a first vertex at included angle α between reference member 28 and projection 30. Likewise, second camera 8 is located at a second vertex at included angle β between reference member 28 and projection 30, and third camera 14 is located at a third vertex at included angle γ between reference member 28 and projection 30.

It is contemplated that first field of view 6, second field of view 10, third field of view 16, tracker field of view 22 can be any optical shape along a long axis of such field of view (6, 10, 16, 22) including conical, collimated, convergent-divergent, and the like. Moreover, an optic independently can be interposed between first camera 4, second camera 8, third camera 14, or tracker 20 and reference member 28. Exemplary optics include a lens, filter, optical chopper, optical modulator, optical fiber, and the like.

Figure 1:
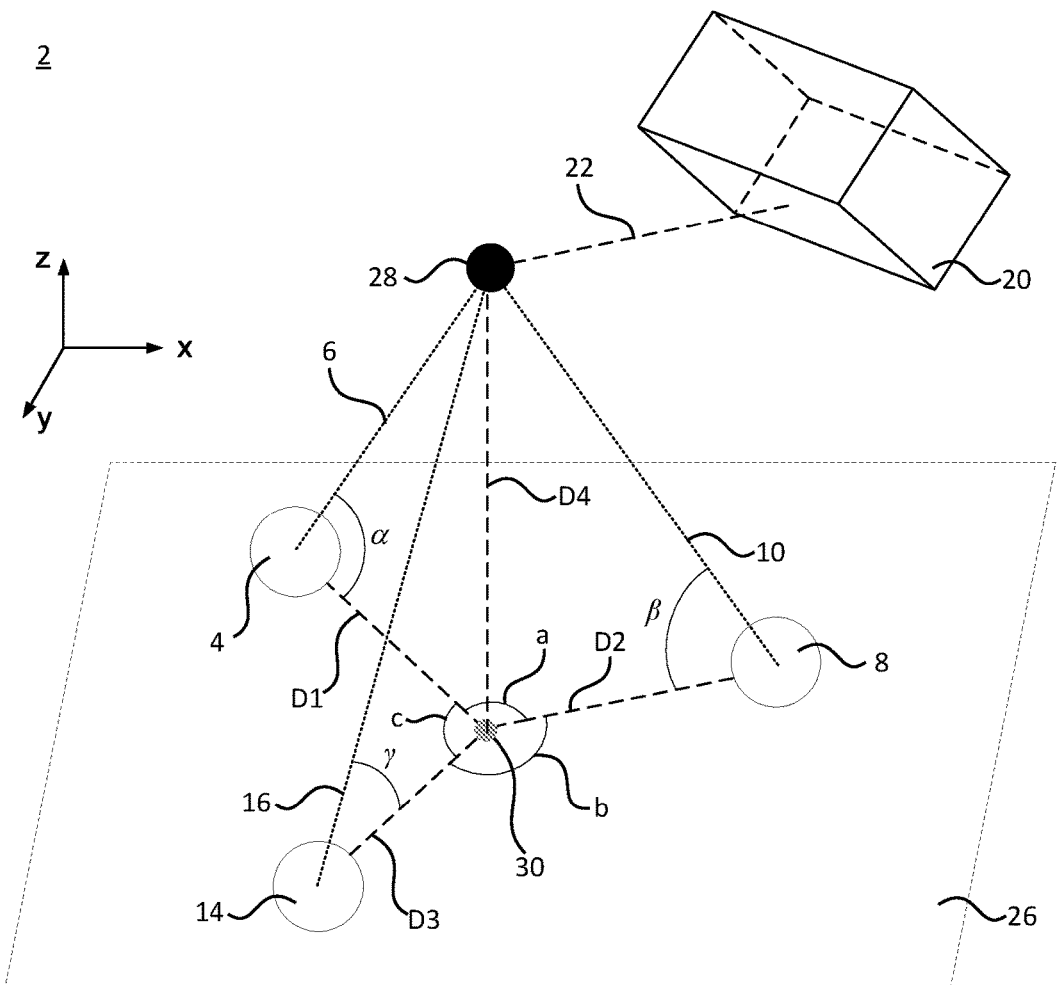
FIG. 1 shows a noncontact metrology probe.
Figure 2:
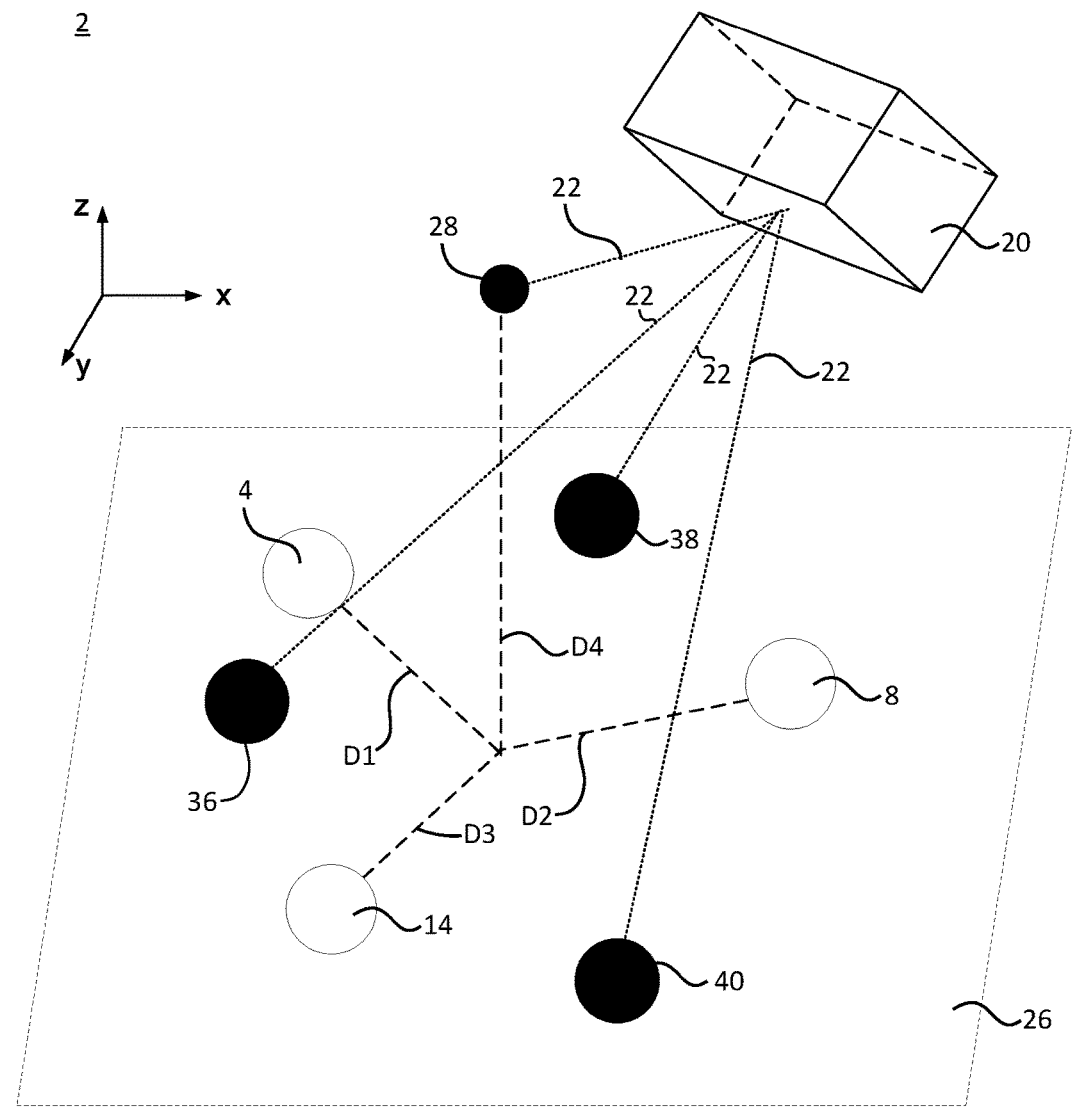
FIG. 2 shows a noncontact metrology probe.

According to an embodiment, as shown in FIG. 2, noncontact metrology probe 2 includes a plurality of secondary members (e.g., secondary members 36, 38, 40) disposed proximate to first camera 4 and second camera 8 in tracker field of view 22 and arranged for tracker 20 to determine a location of secondary members (36, 38, 40). Furthermore, a location of reference member 28 can be referenced to secondary members (36, 38, 40). Here, secondary members (36, 38, 40) are fixedly disposed relative to cameras (4, 8, 14). Accordingly, a location of secondary members (36, 38, 40) relative to cameras (4, 8, 14) is fixed in a coordinate system of tracker 20. In an embodiment, tracker 20 can track a movement of cameras (4, 8, 14) by virtue of tracking a location of secondary members (36, 38, 40). In an embodiment, to coordinate movement or fix a relative position of cameras (4, 8, 14) and secondary members (36, 38, 40), cameras (4, 8, 14) and secondary members (36, 38, 40) are attached to a mounting base such as an optical breadboard or the like.

Figure 3:
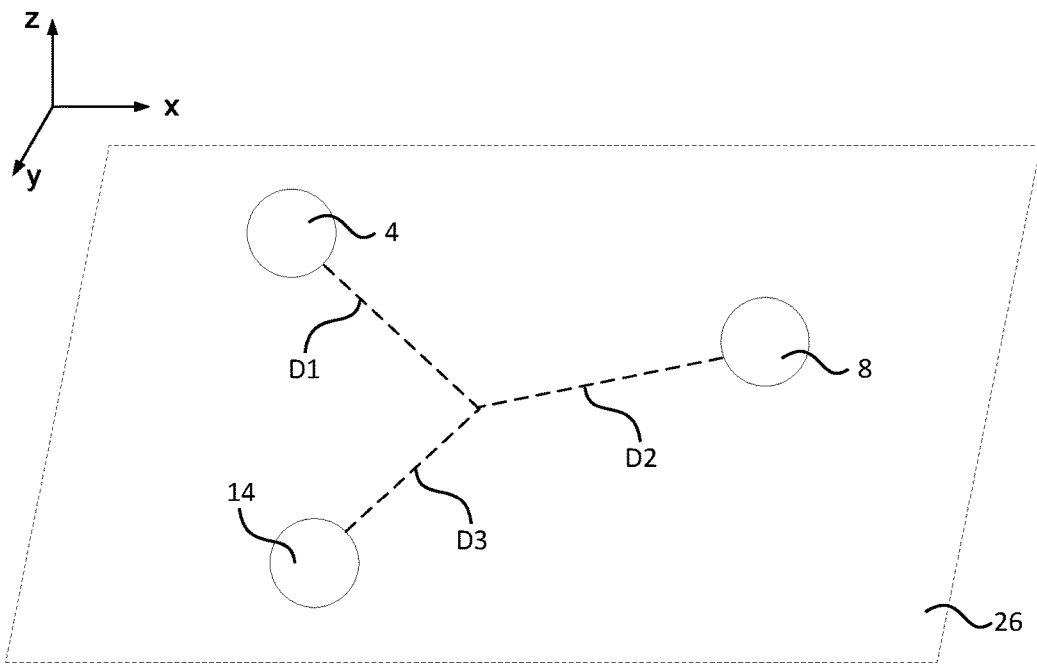
FIG. 3 shows a perspective view of a plurality of cameras.
Figure 4:
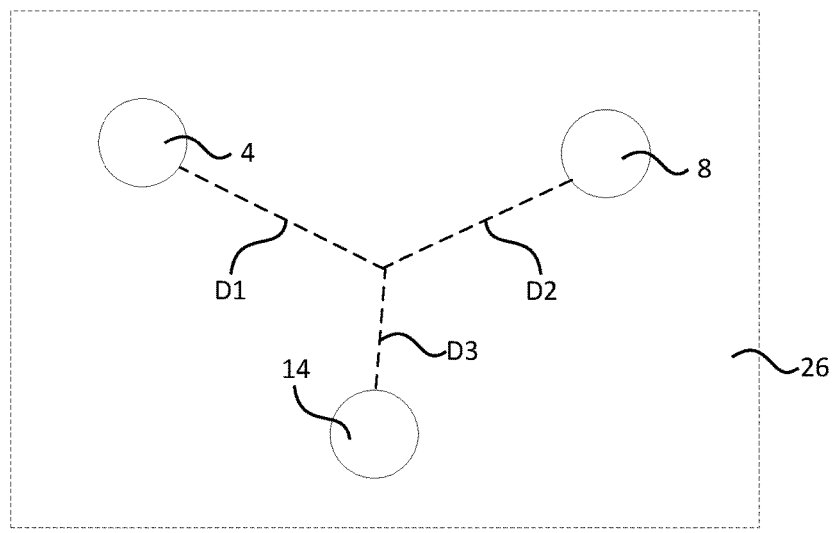
FIG. 4 shows a top view of the cameras shown in FIG. 3.
Figure 5:
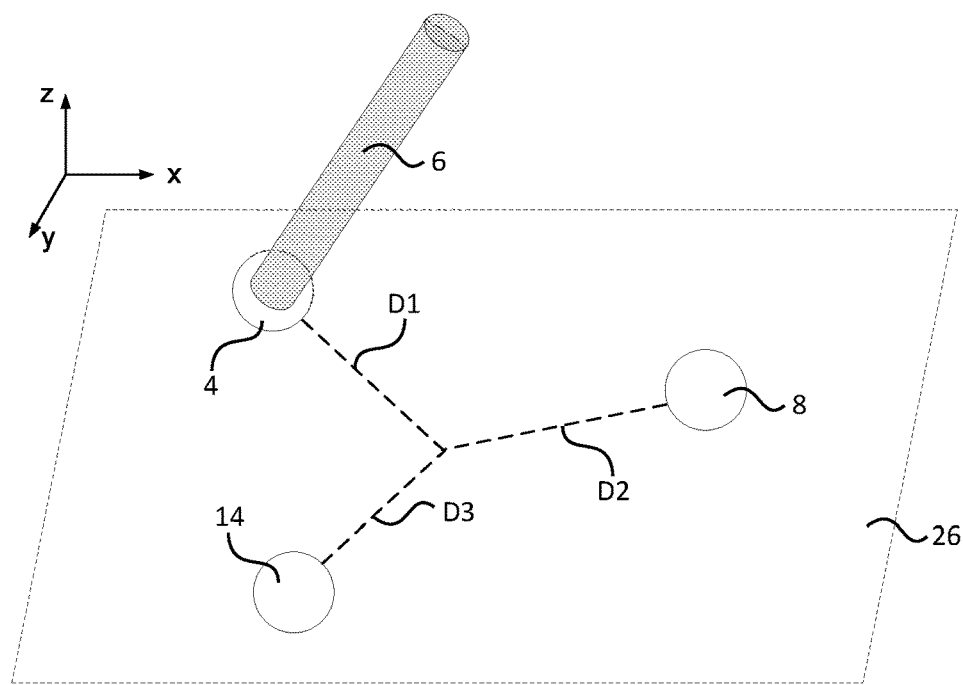
FIG. 5 shows a first field of view of a first camera shown in FIG. 3.

In an embodiment, as shown in FIG. 3 (perspective view of cameras 4, 8, and 14) and FIG. 4, first camera 4, second camera 8, and third camera 14 can be disposed in a trigonal pattern in plane 26. Although three cameras (4, 8, 14) are shown, noncontact metrology probe can include greater than three cameras. In some embodiments, the plurality of cameras (e.g., 4, 8, 14) is disposed linearly in plane 26. According to an embodiment in which there are greater than three cameras, three cameras can be disposed in plane 26, and a camera can be disposed external to plane 26. In a particular embodiment, noncontact metrology probe includes first camera 4, second camera 8, and third camera 14 tetrahedrally disposed to each other in plane 26 with respect to reference member 28. Such a tetrahedron can be a regular tetrahedron or an irregular tetrahedron, based a distance of separation between first camera 4, second camera 8, and third camera 14.

Figure 8:
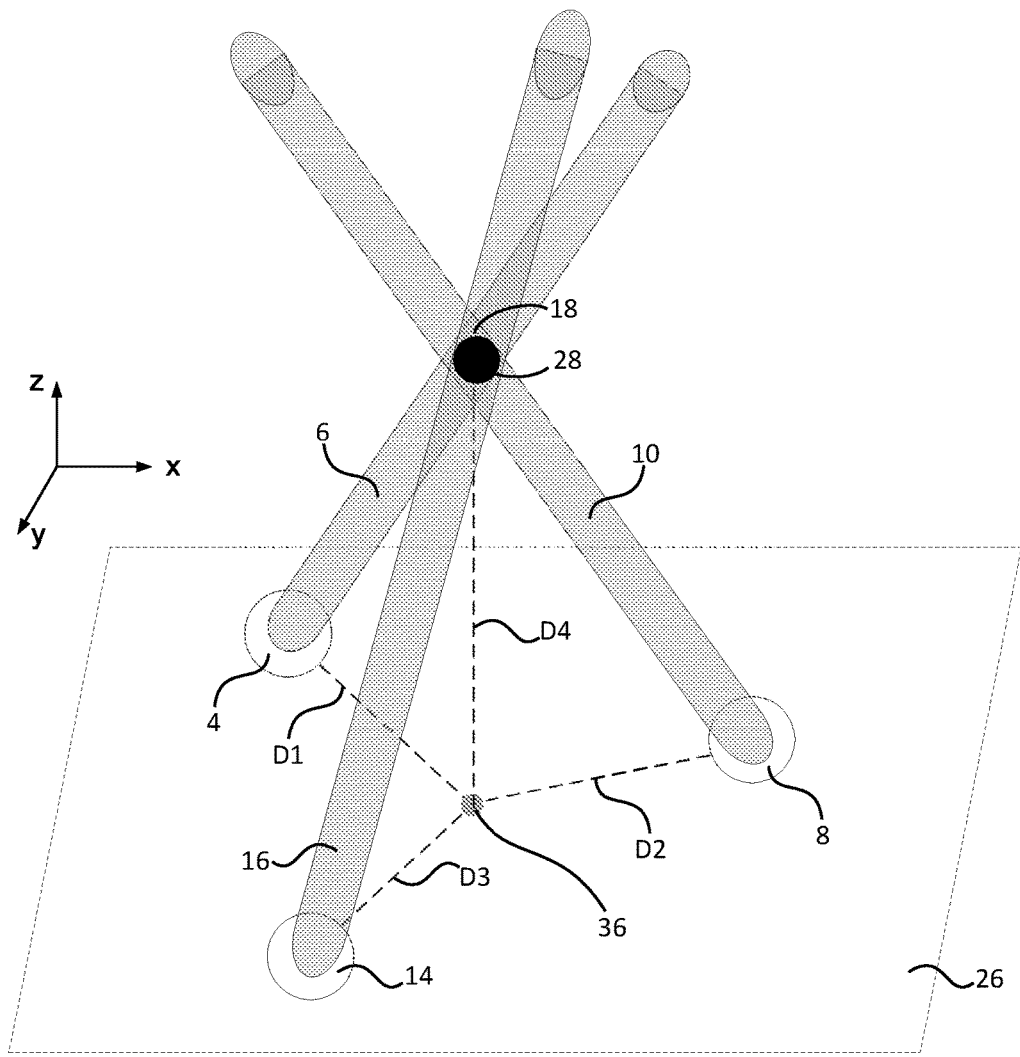
FIG. 8 shows a reference member disposed in the probe focal volume shown in FIG. 3.
Figure 9:
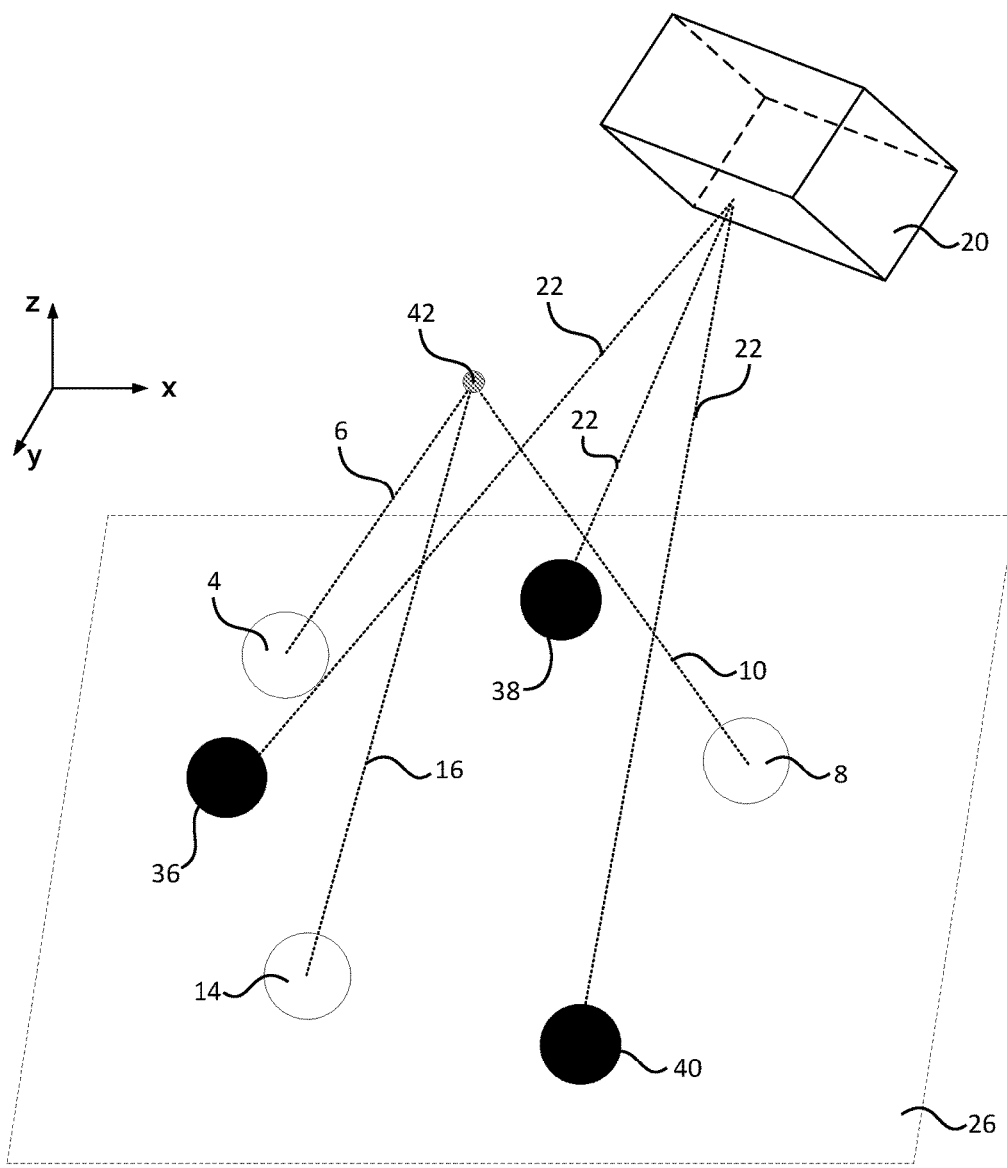
FIG. 9 shows a noncontact metrology probe.

It is contemplated that, as shown in FIG. 8, reference member 28 is disposed in probe focal volume 18. In some embodiments, a portion of reference member 28 maybe disposed external to probe focal volume 18.

Figure 19:
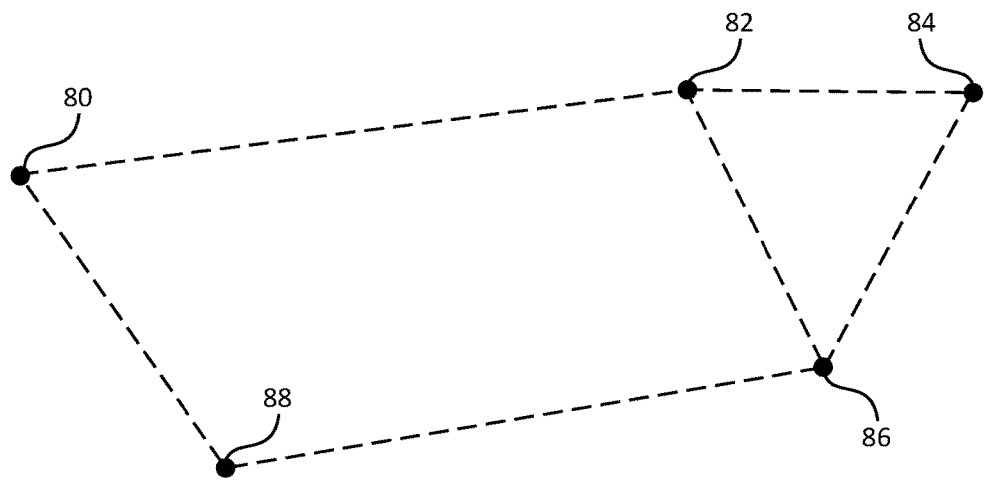
FIG. 19 shows a plurality of centroids corresponding to a reference member and secondary members shown in FIG. 17 and FIG. 18.

In an embodiment, with reference to FIG. 19, images from first camera 4, second camera 8, and third camera 14 are used to determine centroid 42 of reference member 28. It is contemplated that centroid 42 of reference member 28 is stored in a computer readable memory such that reference member 28 can be removed from noncontact metrology probe while maintaining a location of centroid 42 with regard to a location of secondary members 36, 38, 40 in a coordinate system of tracker 20 and also with regard to the location of reference member 28 prior to its removal in the coordinate system of tracker 20. Similarly, images of reference member 28 acquired by cameras (4, 8, 14) and centroids of such images determined from the images are stored in a computer readable memory such that reference member 28 can be removed from noncontact metrology probe while maintaining a location of centroid 42 with regard to the images in a pixel coordinate system of each camera (4, 8, 14). Accordingly, in an embodiment, tracker 20 provides a location of reference member 28 and secondary members (36, 38, 40), wherein the location of reference member 28 and secondary members (36, 38, 40) from tracker 20 is stored in a computer readable medium. The location of reference member 28 and secondary members (36, 38, 40) provided by tracker 20 can be reference to a coordinate system used by tracker 20 or transformed into another coordinate system.

According to an embodiment, centroid 42 determined from images of reference member 28 acquired by first camera 4, second camera 8, and third camera 14 is determined by pixel coordinates of first camera 4, second camera 8, and third camera 14. Moreover, the pixel coordinates of centroid 42 of first camera 4, second camera 8, and third camera 14 collectively provide a spatial location of a geometrical center of reference member 28 in three-dimensional space. The pixel coordinates of cameras (4, 8, 14) are tied to the coordinate system of tracker 20 by locations of reference 28 and secondary members (36, 38, 40).

Figure 10:
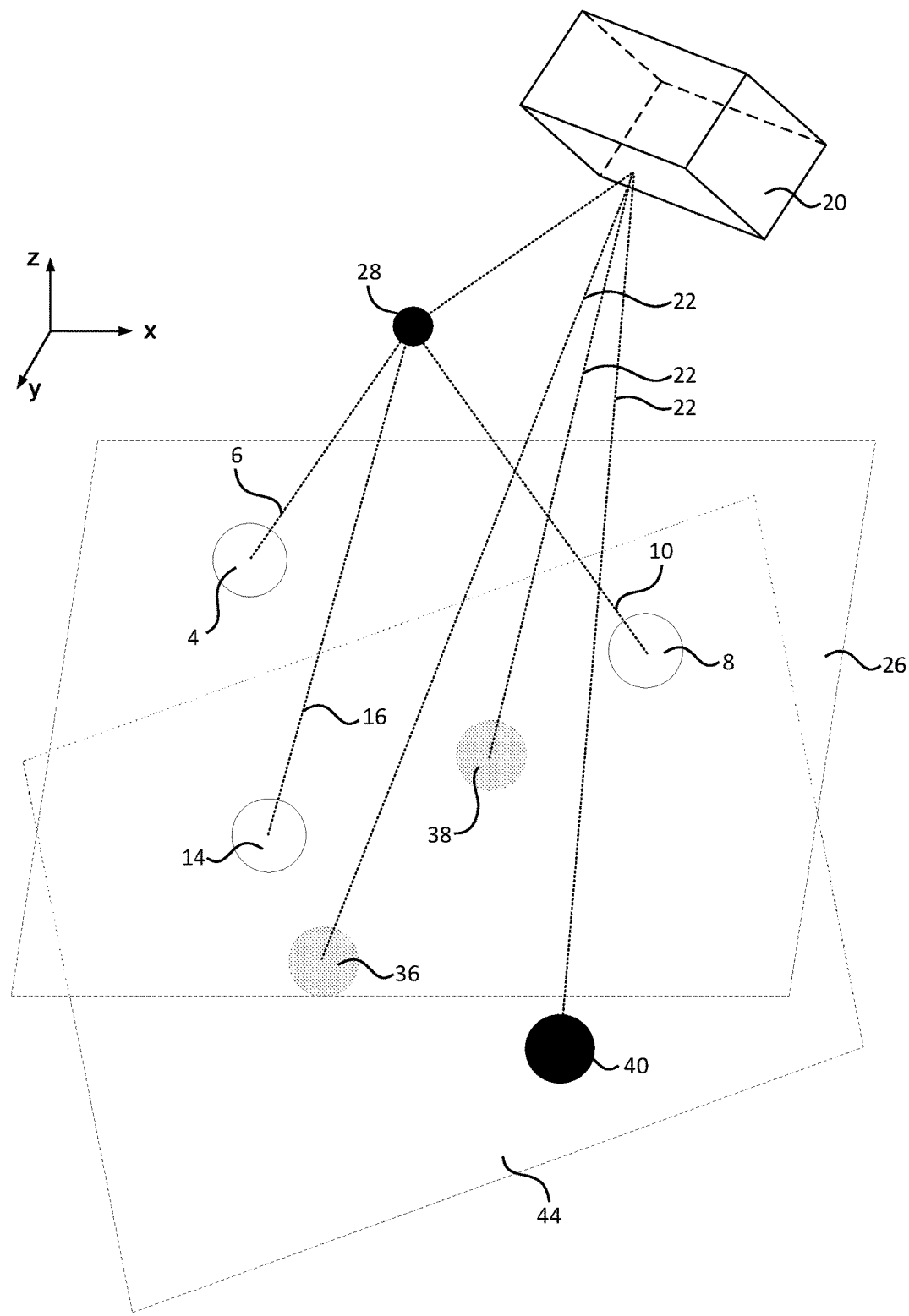
FIG. 10 shows a noncontact metrology probe.

In an embodiment, as shown in FIG. 10, the plurality of secondary members (36, 38, 40) can be disposed in plane 44. Plane 44 can be coplanar with plane 26 or not coplanar. According to an embodiment, plane 44 is not coplanar with plane 26, and none of secondary members (36, 38, 40) is disposed in plane 26. In some embodiments, plane 44 is not coplanar with plane 26, and secondary member (36, 38, or 40) is disposed in plane 26.

Figure 11:
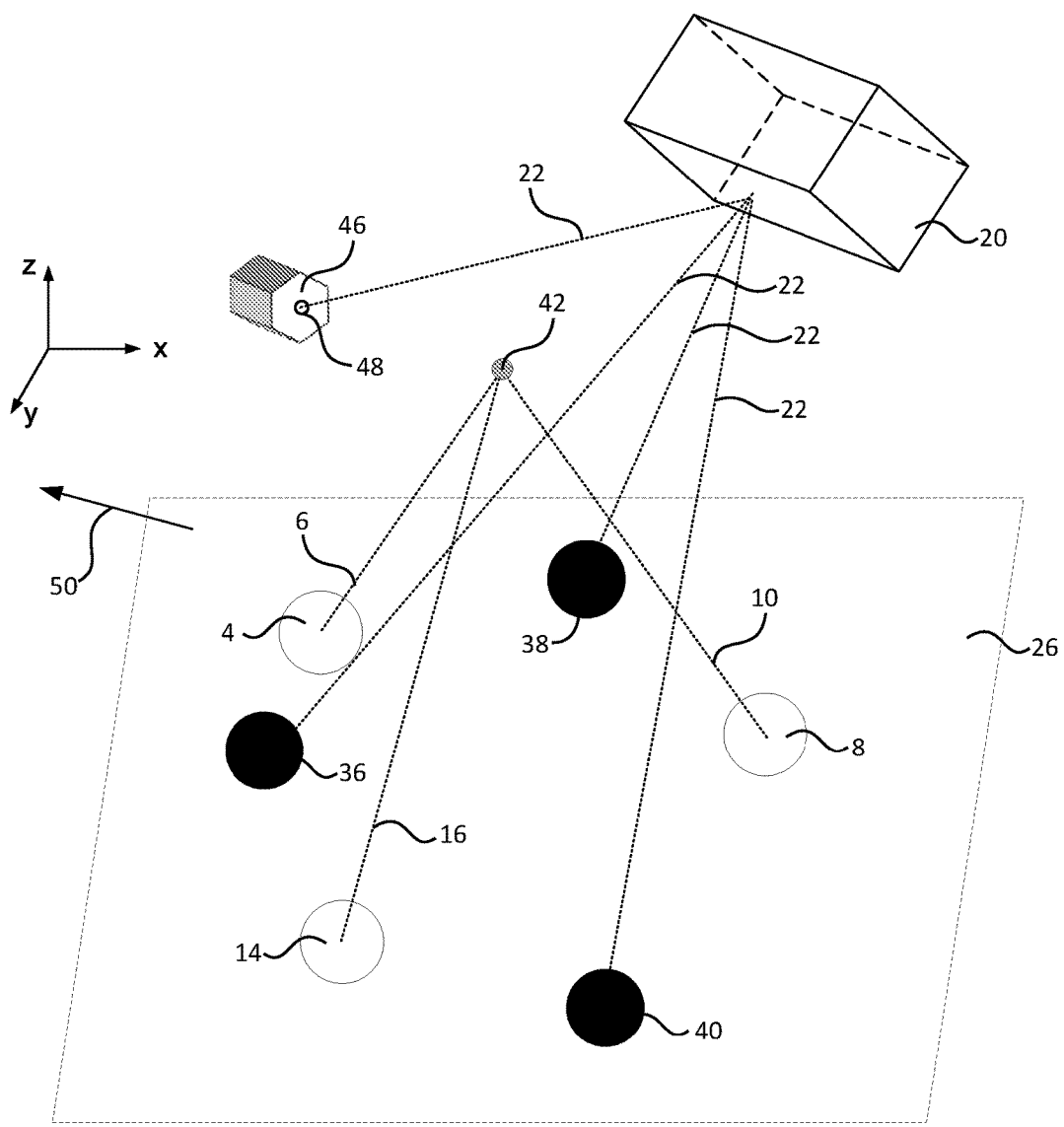
FIG. 11 shows a noncontact metrology probe.
Figure 12:
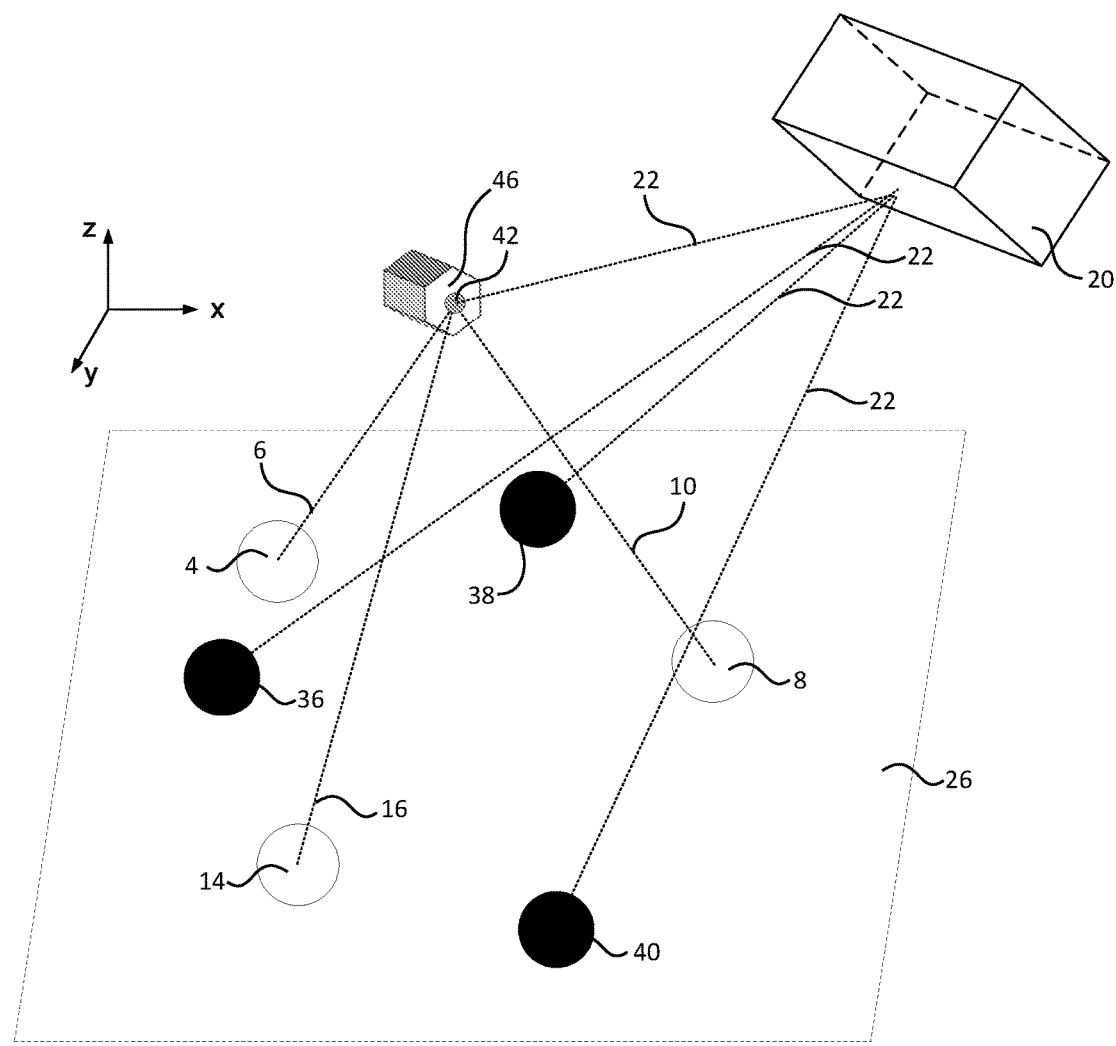
FIG. 12 shows a noncontact metrology probe.

In an embodiment, as shown in FIG. 11, noncontact metrology probe 2 includes object member 46. Here, an element, e.g., a shape or feature such as an edge, of object member 46 can be analyzed to obtain object centroid 48. Reference centroid 42 may not overlap object centroid 48, and cameras (4, 8, 14) and secondary members (36, 38, 40) are moved in direction of motion 52 to overlap reference centroid 42 with object centroid 48 as shown in FIG. 12. Before cameras (4, 8, 14) and secondary members (36, 38, 40) are moved from the first location shown in FIG. 11 to a second position shown in FIG. 12, tracker 20 determines tracker coordinates (i.e., in a coordinate system in a frame of reference used by tracker 20) for secondary members (36, 38, 40) to which pixel coordinates of reference centroid 42 is referenced. Thereafter, cameras (4, 8, 14) and secondary members (36, 38, 40) are moved to the second location shown in FIG. 12 to overlap reference centroid 42 with object centroid 48. Second locations of secondary members (36, 38, 40) are determined by tracker 20 from which the second location of cameras (4, 8, 14) and reference centroid 42 can be determined. By comparing the tracker coordinates of the first position of reference centroid 42 to the tracker coordinates of the second position of reference centroid 42, tracker 20 can provide a direction or distance of travel of reference centroid 42 or dimensional information (e.g., size) of object member 46.

It is contemplated that a position of tracker 20 may be changed or not changed in response to or independent of movement of cameras (4, 8, 14) or secondary members (36, 38, 40). According to an embodiment, tracker 20 is immobile, and cameras (4, 8, 14) and secondary members (36, 38, 40) synchronously move together. In a certain embodiment, cameras (4, 8, 14) and secondary members (36, 38, 40) synchronously move together, and tracker 20 moves asynchronously with motion of cameras (4, 8, 14) and secondary members (36, 38, 40). In a particular embodiment, tracker 20 moves synchronously with motion of cameras (4, 8, 14) and secondary members (36, 38, 40).

Figure 13:
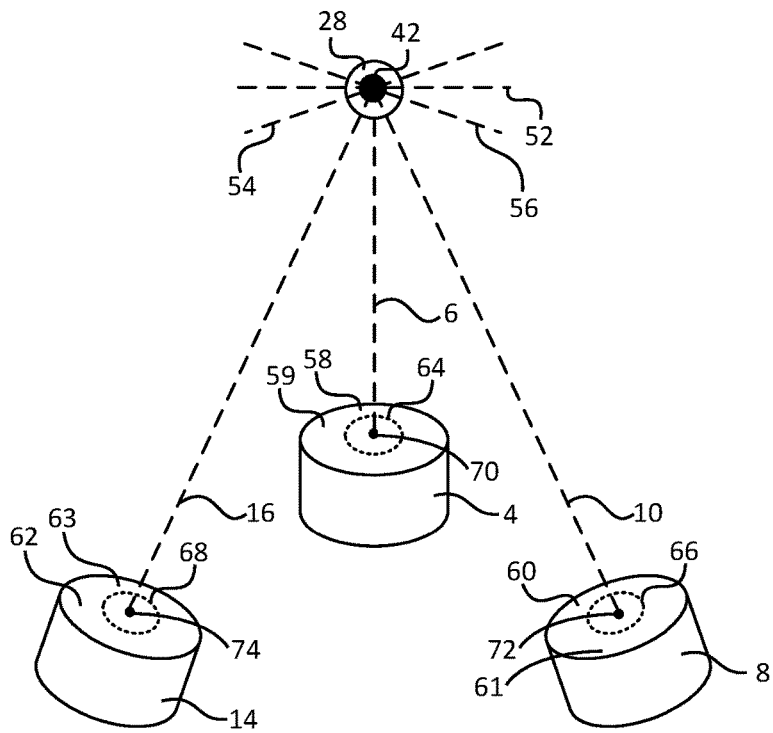
FIG. 13 shows a reference member disposed proximate to cameras of a noncontact metrology probe.

In an embodiment, noncontact metrology probe 2 includes the plurality of cameras, e.g., first camera 4, second camera 8, and third camera 14. Cameras (4, 8, 14) independently include a plurality of pixels, wherein the pixels can be identified by pixel coordinates. As shown in FIG. 13, first camera 4 includes a plurality of first pixels 58, and first pixels 58 individually have first pixel coordinate 59. Similarly, second camera 8 includes a plurality of second pixels 60, and second pixels 60 individually have second pixel coordinate 61. Further, camera 14 includes a plurality of third pixels 62, and third pixels 62 individually have third pixel coordinate 63. Additionally, cameras (4, 8, 14) respectively include image plane (52, 54, 56) disposed at a distance from pixels (58, 60, 62). Accordingly, cameras (4, 8, 14) respectively acquire first reference image 64, second reference image 66, and third reference image 68 of reference member 28. The plurality of pixel coordinates (59, 61, 63) of reference images (52, 54, 56) are used to determine a centroid of reference member 28 in probe focal volume 18. Moreover, first pixel coordinates 59 corresponding to first reference image 64 can be analyzed to determine first reference image centroid 70; second pixel coordinates 61 corresponding to second reference image 66 can be analyzed to determine second reference image centroid 72, and third pixel coordinates 63 corresponding to third reference image 68 can be analyzed to determine third reference image centroid 74. Projection of first reference image centroid 70, second reference image centroid 72, and third reference image centroid 74 onto probe focal volume 18 (which is located at an intersection of image planes (52, 54, 56)) produces reference centroid 42. In an embodiment, reference member 28 in combination with secondary members (36, 38, 40, and the like) are used to reference a location of reference centroid 42 in the tracker coordinate system of tracker 20 during calibration of noncontact metrology probe 2. The location of reference centroid 42 is known in the tracker coordinate system, and pixel coordinates (59, 61, 63) of reference image centroids (70, 72, 74) are known for each camera (4, 8, 14) so that pixel coordinates (59, 61, 63) are linked indirectly in the tracker coordinate system of tracker 20 by virtue of the projection of reference member 28 onto pixels (58, 60, 62) of cameras (4, 8, 14).

Figure 14:
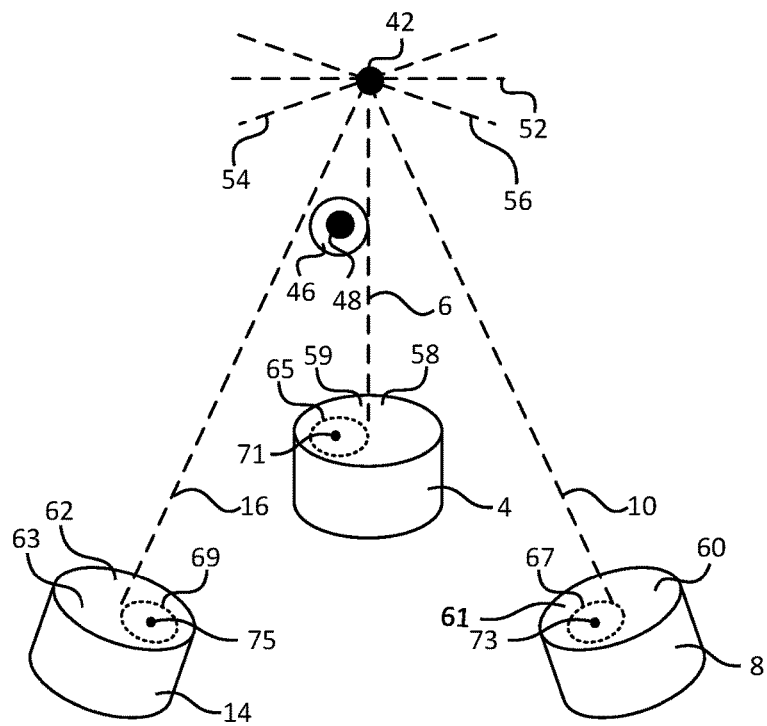
FIG. 14 shows an object member disposed proximate to cameras of a noncontact metrology probe.

In an embodiment, reference member 28 optionally is removed from noncontact metrology probe 2 after calibration of noncontact metrology probe 2 provides the location of reference centroid 42 in the tracker coordinate system of tracker 20 as well as providing the pixel coordinates (59, 61, 63) of reference image centroids (70, 72, 74). With reference to FIG. 14, object member 46 is disposed in noncontact metrology probe 2. Here, the location of reference centroid 42 is, e.g., stored in a computer readable memory and connects pixel coordinates (59, 61, 63) to the tracker coordinate system of tracker 20 even in an absence of reference member 28. It should be appreciated that reference centroid 42 is a virtual representation and is not physically embodied apart from reference member 28. However, since the location of reference centroid 42 in the tracker coordinate system of tracker 20 is known, reference centroid 42 can be superimposed virtually in probe focal volume 18 or superimposed virtually on an element, e.g., object member 46 when object member 46 is disposed in probe focal volume 18. If object member 46 is not disposed in probe focal volume 18, reference centroid 42 will not be superimposed virtually on object member 46 but can be superimposed in probe focal volume 18. Accordingly, after disposal of object member 46 at an arbitrary location in noncontact metrology probe 2, cameras (4, 8, 14) respectively acquire first object image 65, second object image 67, and third object image 69 of object member 46. The plurality of pixel coordinates (59, 61, 63) of object images (65, 67, 69) are used to determine object centroid 48 of object member 46 in noncontact metrology probe 2. Moreover, first pixel coordinates 59 corresponding to first object image 65 can be analyzed to determine first object image centroid 71; second pixel coordinates 61 corresponding to second object image 67 can be analyzed to determine second object image centroid 72, and third pixel coordinates 63 corresponding to third object image 68 can be analyzed to determine third object image centroid 74. Projection of first object image centroid 70, second object image centroid 72, and third object image centroid 74 onto object image 46 produces object centroid 48. In some embodiments, when tracking or measuring an object member, noncontact metrology probe 2 is used to locate a very small region (e.g., a point location) of the object member that fits within the field of view of single pixels of cameras (4,8.14) and that represents a reference centroid 42.

Camera (4, 8, 14) can be various types of image capture devices. Exemplary cameras include charge coupled devices; complementary metal-oxide semiconductor (CMOS) sensors; thermal microbolometer arrays; an array of optical, infrared or ultraviolet sensors, and the like. Camera (4, 8, 14) includes pixels (58, 60, 62) arranged in various formats such as an array. The number of pixels included in the camera (4, 8, 14) is effective to acquire images (first image, second image, third images, and the like) of reference member 28 or object member 46. Camera (4, 8, 14) acquires images at various wavelengths, which can include a broadband of wavelengths such as a visible wavelength, ultraviolet wavelength, infrared wavelength, and the like, or a combination thereof. Moreover, an optical filter can be interposed between camera (4, 8, 14) and image plane (52, 54, 56) to provide wavelength or optical polarization selectivity or sensitivity to camera (4, 8, 14).

It is contemplated that camera (4, 8, 14) acquires images (e.g., 64, 66, 68 65, 67, 69) of reference member 28 or object member 46. Images (64, 66, 68 65, 67, 69) include direct images of reference member 28 or object member 46 or indirect images of reference member 28 or object member 46. Camera (4, 8, 14) can acquire light reflected from member (28, 46), light emitted from member (28, 46), light transmitted through member (28, 46), light transmitted around member (28, 46), and the like. In an embodiment, reference member 46 is interposed between camera (4, 8, 14) and a light source, and camera (4, 8, 14) acquires an image of reference member 46 as a shape that blocks a portion of light from the light source.

According to an embodiment, noncontact metrology probe 2 includes reference member 28 that includes a light reflector, a light emitter, a light blocker, a light filter, or a combination thereof. In an embodiment, reference member 28 is the light reflector that includes a spherical mirror reflector, a six-degree-of-freedom tracker target, or a combination comprising at least one of the foregoing. In a particular embodiment, reference member 28 is the spherical mirror reflector. Exemplary spherical mirror reflectors include a corner cube reflector, retroreflective spherical target as used in photogrammetry, and the like.

In an embodiment, noncontact metrology probe 2 includes secondary members (36, 38, 40, 37, 39) that independently include a light reflector, a light emitter, a light blocker, a light filter, or a combination thereof. Secondary member (36, 38, 40, 37, 39) can be a same as or different than reference member 28. In an embodiment, secondary members are a spherical mirror reflector.

Noncontact metrology probe 2 can include object member 46. Here, object member 46 can be disposed in probe focal volume 18 or external to probe focal volume 18. Object member 46 is an item that is subjected, by noncontact metrology probe 2, to tracking (by tracker 20) a movement or location of object member 46; positioning in one-, two-, or three-dimensional space; sizing; determining its surface topology; associating optical or infrared spectral or polarization properties to physical aspects of object member 46; and the like.

Object member 46 can have a size and shape that is not particularly limited. A portion of object member 46 can be subjected to being tracked by tracker 20 or imaged by cameras (4, 8, 14). A size of object member 46 can be, e.g., less than 1 millimeter (mm); greater than 1 meter (m); from 1 cm to 10 m, specifically from 1 mm to 1 centimeter (cm), and more specifically from 1 micrometer (μm) to 1 mm. In a particular embodiment, object member 2 has a size that is less than 10 μm. In some embodiments, a size of a portion of object member 2 that is subjected to image acquisition by cameras (4, 8, 14) is 2 mm. Moreover, a shape of object member 46 can be any shape that cameras (4, 8, 14) can image.

Additionally, object member 46 can include tangible objects made of optically semitransparent, transparent, reflective, soft materials such as liquid and wax, or objects that are in tangible or virtually present such as the distribution of light from a laser beam, a projected image of a real object, or a hologram.

In an embodiment, noncontact metrology probe 2 includes tracker 20. Tracker 20 tracks a location of reference member 28 or secondary members (36, 38, 40, 37, 39). Moreover, tracker 20 monitors a location of reference member 28 or secondary members (36, 38, 40, 37, 39) in the tracker coordinate system. The tracker coordinate system is generated via software and linked to spatial locations of reference member 28 or secondary members (36, 38, 40, 37, 39) by detecting such spatial locations using an optical detector. According to an embodiment, reference member 28 or secondary members (36, 38, 40, 37, 39) are spherical mirror reflectors such that tracker 20 provides a laser beam that is reflected from reference member 28 or secondary members (36, 38, 40, 37, 39) and detected by an optical detector of tracker 20. Moreover, tracker 20 can also measure six-degree of freedom reference members to provide measurement and tracking of full six-degree of freedom motion and position. Exemplary trackers 20 include a laser tracker, photogrammetry tracking system, structured light scanning system, and the like.

In an embodiment, a process for making noncontact metrology probe 2 includes providing first camera 4; disposing second camera 8; arranged second camera 8 such that second field of view 10 overlaps first field of view 6 to form prime focal volume 12; disposing third camera 14; arranging third camera 14 such that third field of view 16 overlaps prime focal volume 12 to form probe focal volume 18; and disposing tracker 20 configured to determine a location of probe focal volume 18 in tracker field of view 22 to make noncontact metrology probe 2. The process further can include disposing reference member 28 in probe focal volume 18. Additionally, the process can include disposing a plurality of secondary reference members (36, 38, 40) proximate to first camera 4, second camera 8, or third camera 14, wherein secondary reference members (36, 38, 40) are disposed in tracker field of view 22. In some embodiments, the process includes disposing object member 46 in first field of view 6, second field of view 10, third field of view 16, or combination thereof. In a certain embodiment, the process includes disposing first camera 4, second camera 8, third camera 14, or combination thereof on a substrate, e.g., an optical breadboard.

In an embodiment, a process for calibrating noncontact metrology probe 2 includes providing noncontact metrology probe 2 that includes first camera 4 including first field of view 6; second camera 8 including second field of view 10; third camera 14 including third field of view 16; and tracker 20 including tracker field of view 22. The process also includes overlapping first field of view 6 with second field of view 10 to form prime focal volume 12; overlapping prime focal volume 12 with third field of view 16 to form probe focal volume 18; and overlapping tracker field of view 22 with probe focal volume 18 to calibrate noncontact metrology probe 2. Additionally, the process can include providing reference member 28 in probe focal volume 18; acquiring first image 64 of reference member 28 by first camera 4; acquiring second image 66 of reference member 28 by second camera 8; acquiring third image 68 of reference member 28 by third camera 14; determining a plurality of first pixel coordinates 59 of a feature of reference member 28 from first image 64; determining a plurality of second pixel coordinates 61 of the feature of reference member 28 from second image 66; determining a plurality of third pixel coordinates 63 of the feature of reference member 28 from third image 68; and determining reference centroid 48 of the feature of reference member 28 from first pixel coordinates 59, second pixel coordinates 61, and third pixel coordinates 63. In an embodiment, the feature includes an edge of reference member 28.

According to an embodiment, the process for calibrating noncontact metrology probe 2 further includes disposing a plurality of secondary members (36, 38, 40, 37, 39) proximate to first camera 4 and second camera 8 in tracker field of view 20; acquiring, by tracker 20, individual locations of secondary members (36, 38, 40, 37, 39); and referencing reference centroid 48 to the individual locations. In this manner, the locations of the secondary members (36, 37, 38, 39, 40), reference member 28, and reference centroid 48 can be identified by coordinates in the tracker coordinate system of tracker 20. Further, the locations of the secondary members (36, 37, 38, 39, 40) and reference member 28 in the tracker coordinate system will be linked to pixel coordinates (59, 61, 63) of camera (4, 8, 14) via reference centroid 48. It is contemplated that a location of secondary members (36, 37, 38, 39, 40) is fixedly associated with a location of cameras (4, 8, 14) such that tracking a movement promotion of secondary members (36, 37, 38, 39, 40) will provide a location of cameras (4, 8, 14) and also reference centroid 48.

In a process for determining a location of object member 46, the process further includes disposing object member 46 at an arbitrary location with respect to reference centroid 42; acquiring first image 65 of object member 46 by first camera 4; acquiring second image 67 of object member 46 by second camera 8; acquiring third image 69 of object member 46 by third camera 14; determining a plurality of first pixel coordinates 59 of first image 65; determining a plurality of second pixel coordinates 61 of second image 67; determining a plurality of third pixel coordinates 63 of third image 69; determining object centroid 48 of object member 46 at the arbitrary location from first pixel coordinates of object member object image centroid 71, second pixel coordinates 61 of second object image centroid 73, and third pixel coordinates 63 of third object image centroid 75; and referencing object centroid 48 to the individual locations of secondary members (36, 38, 40) to determine a first location of object member 46 relative to reference centroid 42.

In some embodiments, instead of determining object centroid 48, it is contemplated that calculation of a centroid of whole of object member 46 can be made or determining a center of a feature on object member 46, the feature being the same size as a pixel of camera (4, 8, 14). Here, noncontact metrology probe 2 measures a single point location on object member 46. From a plurality of such point locations, the process can include constructing a geometry that these points occupy. Once the feature is identified, the feature is disposed at pixel coordinates in images for each camera (4, 8, 14) at the same time. In this manner, the point is located on object member 46 such that determination of a centroid of object member 46 optionally can be skipped.

According to an embodiment, the process further can include moving object member 46 from the arbitrary location to a second location; determining object centroid 48 of object member 46 at the second location; referencing object centroid 48 of object member 46 at the second location to the individual locations of secondary members (36, 38, 40) to determine the second location of object member 46 relative to reference centroid 42; and tracking movement of object member 46 by comparing the first location to the second location. In a certain embodiment, the process includes moving object member 46 from the arbitrary location to a third location, wherein object centroid 48 overlaps reference centroid 42 at the third location. In some embodiments, instead of determining object centroid 48, a feature (e.g., a spot, aperture, edge, shape, size, and the like) of object member 46 can be determined by acquiring images of the feature with cameras (4, 8, 14) and referencing the feature in the images to pixel coordinates of cameras (4, 8, 14), which can be linked to the tracker coordinates system via reference centroid 42.

Noncontact metrology probe 2 and processes herein have advantageous and beneficial properties and uses. It is contemplated that noncontact metrology probe 2 determines a property of object member 46, wherein the property includes a location; an orientation; a size; or a combination thereof in an absence of contact between object member 46 and first camera 4, second camera 8, third camera 14, or tracker 20.

Moreover, noncontact metrology probe 2 determines the location or size of object member 46 to an accuracy of less than or equal to 1 µm. Additionally, noncontact metrology probe 2 determines the orientation and the location of object member 46 in six degrees of freedom. In some embodiments, noncontact metrology probe 2 provides determination of object centroid 48 of object member 46, detection of an edge of object member 46, determination of a location of a fiducial (e.g., a marking on object member 46, an indentation in the object member 46, a projection from object member 46, and the like) disposed on object member 46, inspection of object member 46, or a combination thereof. Noncontact metrology probe 2 can provide determination of an absolute alignment of object member 46 with respect to an auxiliary member (for example a second object member or secondary reference member) disposed in a location relative to the secondary members.

Further, noncontact metrology probe 2 has beneficial properties such as being based on images acquired by cameras (4, 8, 14); being physically contactless (i.e., free from physical contact); independent of a particular type of illumination (e.g., any wavelength of light can be used to acquire images, including phase contract and light blocking); being scalable to selected resolutions; being used in conjunction with image analysis algorithms to connect features in an image to the tracker coordinate system; providing adjustability of spatial resolution or effective size of noncontact metrology probe 2 on the fly from one pixel in size to a plurality of pixels such as by adjusting a number of pixels grouped around pixel coordinates of reference member 28. Additionally, noncontact metrology probe 2 provides spatial metrology for object member 46 in the case where object member 46 includes a material with low albedo (e.g., optically semitransparent, transparent material), a material that is highly optically reflective (e.g., soft materials such as liquid and wax), an object that is intangible or virtually present (e.g., a distribution of light from a laser beam, a projected image of a real object, a hologram, and the like), and the like. Noncontact metrology probe 2 can simultaneously acquire or determine spatial information and optical, infrared, spectral, polarization properties for object member 46.

Noncontact metrology probe 2 can provide noncontact, optical tracking and size information for object member 46 that is substantially larger than noncontact metrology probe 2, made of solid material, can be physically contacted without deformation, has well characterized albedo, or lacks sharp edges or corners. Additionally, noncontact metrology probe 2 provides noncontact, optical tracking or size information for object member 46 that is substantially smaller than noncontact metrology probe 2. In an embodiment, object member 46 (e.g., a millimeter (mm)-wave antenna) includes dimensions for a feature of interest that is less than or equal to 1 mm; has a sharp corner; has a sharp edge; includes polished metal; is too delicate to contact; or a combination thereof. Noncontact metrology probe 2 provides spatial metrology of such object member 46.

Beneficially, noncontact metrology probe 2 is a working distance they can be from 1 mm to 500 mm, e.g., a working distance that is greater than 100 mm. Here, noncontact metrology probe 2, e.g., camera (4, 8, 14), does not interfere with object member 46 (e.g., an antenna) or mounting hardware for object member 46. Advantageously and surprisingly, noncontact metrology probe 2 has a field of view (6, 10, 16, 22) sufficiently large enough to image or track object member 46, e.g., entire antenna component. In an embodiment, noncontact metrology probe 2 includes a high pixel resolution and large total field of view, e.g., a 30 µm pixel resolution across a total field of view, e.g., 3 cm×3 cm at a working distance of 100 mm between camera (4, 8, 14) and object member 46.

Noncontact metrology probe 2 can be used for various metrological purposes, including integration with a machine vision system, noncontact spatial characterization of object member 46 (e.g., antenna) such as aperture centroiding, aperture detection, fiducial marker locating, and inspecting. Moreover, noncontact metrology probe 2 can provide for manipulation of a plurality of antennas or other objects for relative alignment of antennas. It is contemplated that noncontact metrology probe 2 can be used for absolute alignment of antennas by linking machine vision information to tracker 20 of noncontact metrology probe 2. In this manner, noncontact metrology probe 2 can precisely locate object member 46, e.g., a mm wave antenna, for aligning and positioning such as a nearfield scanner.

The articles and processes herein are illustrated further by the following Examples, which are non-limiting.

EXAMPLES

Example 1

Noncontact Metrology Probe

The noncontact metrology probe (NMP) is based on optical imaging and includes three cameras arranged in a tetrahedral and include three 2592×1944 CMOS pixel arrays (also referred to as focal plane arrays FPA) and three 12.5 mm focal length low distortion machine vision lenses. From each camera, a single pixel was linked to a laser tracker through a calibration process we describe below. These three pixels were then used to unambiguously define a single point in space, P* that was known in the native coordinate frame of the laser tracker (LT). Because P* was defined through the camera images, it is in actuality a virtual object that is conjugate to the physical pixels in each FPA. As such, there is nothing physically there at the location of P*. In use, P* is a set of pixel coordinates from each camera and can be virtually placed on the object we wish to measure by using the camera images. Here, the NMP does not physically touch the object under measure. The FPAs provide spatial resolution about tens of μm and also makes the spatial resolution of the NMP scalable by judicious choices of FPA pixel size and lens focal length. The NMP had approximately 25 μm spatial resolution.

The non-contact imaging nature of the NMP allowed novel measurement modalities not obtainable with other LT probes and targets, such as measuring sharp corners, sharp edges, objects that are soft, optically transparent, objects of high and low reflectance as well as virtual objects (such as an image of a real object). In addition, other optical information such as geometries determined from machine vision algorithms, thermal infrared data, spectral and polarization information that represents other physical quantities could also be simultaneously linked to the spatial measurement of the LT. This provides a measurement framework to perform direct multi-physics measurements with a LT. Such measurements could be used to compare multi-physics simulations with real data at the spatial resolution of the NMP. The NMP can also be used for robot Tool Center Point (TCP) calibration and teaching with spatial resolution and accuracy about tens of μm. The imaging properties of the NMP provide robot tool end effectors to be measured such as water jets, laser welding spots, and the like.

Example 2

Point Projection to a Pixel

Although spatial resolution is readily obtained in the image plane transverse to the optical axis (OA), for a single lens system the spatial resolution along the OA is provided by the depth of focus (DOF) of the lens and not pixel resolution. The DOF is the distance over which an object can be shifted along the OA while remaining in focus. In a ray optics picture, this distance can be considered zero. However, due to the wave nature of light in a real optical system, the DOF is a non-zero value that depends on the ratio of the focal length to lens aperture, i.e., the f-number denoted as F/#. The DOF for a rotationally symmetric lens can be closely modeled with a Gaussian beam. Consider the expression for a Gaussian beam generated by a lens. The DOF for such a beam is given by formula (1).

$$DOF = \frac{8\lambda}{\pi}(F/\#)^2. \quad (1)$$

If we want to measure the displacement of an object along the OA then we would want a relatively small DOF, such that we determined the plane of our object to within the error provided by the DOF. From (1), small DOF is produced from small F/#. However, this may come at expense of a bringing the object we are imaging close to the lens and also a decrease in image field of view. For instance, a 50×, F/0.9 microscope objective has very good DOF resolution of ≈1 μm, but with an object-to-lens distance (working distance) of only ≈1 cm, the field of view is ≈50 μm.

In contrast to a microscope objective, a typical machine vision lens has a comparatively long DOF of several millimeters, yet does provide transverse resolution of tens of μm, with a respectable field of view of tens of mm and working distance of hundreds of mm. For the NMP, the camera lens and FPA used allow for roughly a 25 μm pixel resolution across a total FOV of roughly 3 cm×3 cm at a working distance of 100 mm.

Using only a single lens to locate an object in three dimensions would result in good spatial discrimination of position of the object transverse to the OA in the image plane. However, this lens would produce a comparatively ambiguous measure of object location along the lens OA. Therefore, to obtain the same spatial discrimination along the OA that can be achieved in the image plane, a way to break the ambiguity that results from the relatively long DOF of the lens is used.

Figure 15:
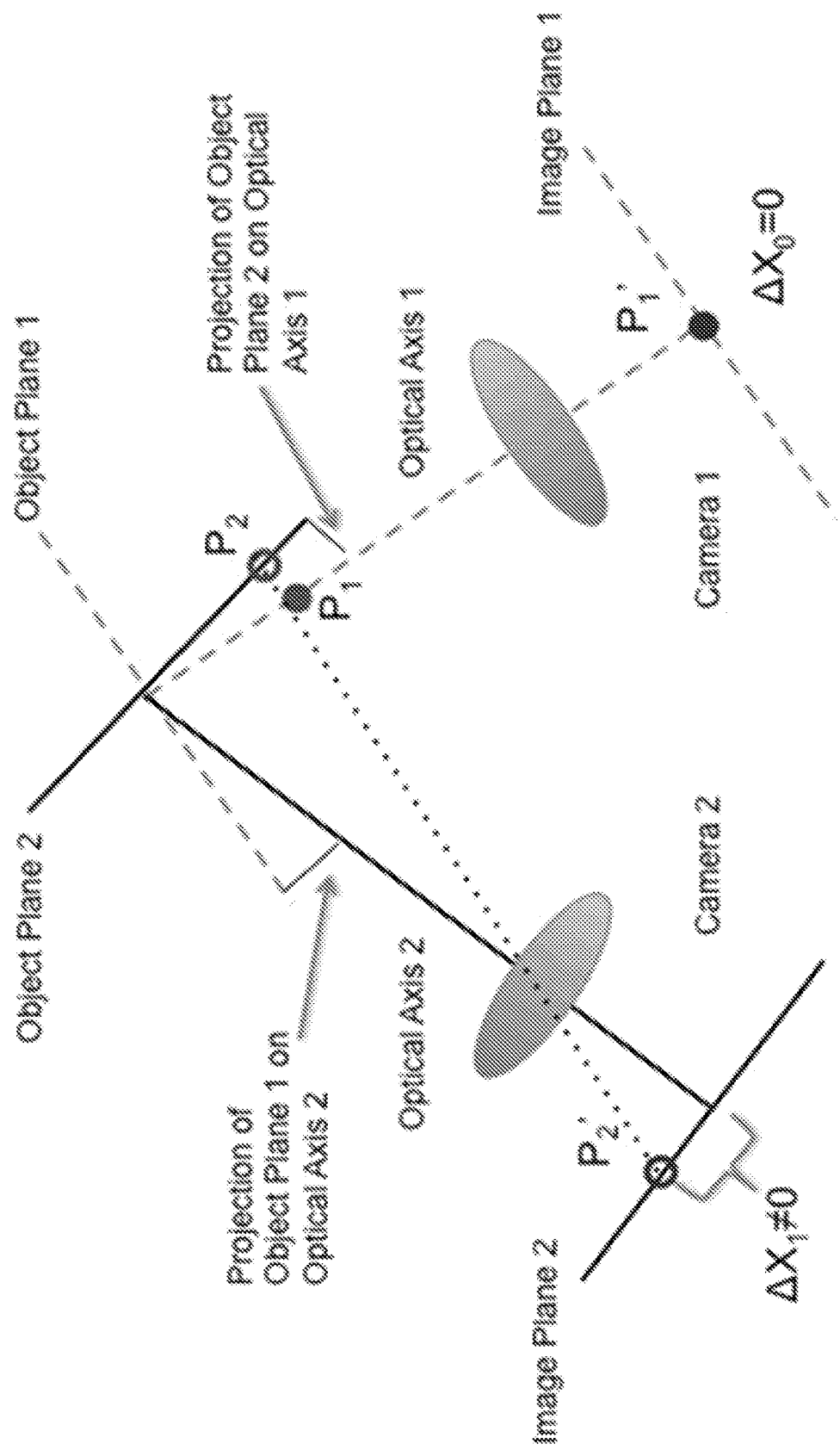
FIG. 15 shows a geometry cameras in a noncontact metrology probe.

Point projection onto multiple images planes was used to address the DOF ambiguity of a single lens. To accomplish this a three-camera approach was used. Three cameras were nominally oriented in a tetrahedral such that the OA of one camera was projected along the image plane of the others. This way a movement of a point along the OA of one camera was seen as a translation in the other two and thus the DOF ambiguity was broken. As such, the FPA of the other two cameras provided spatial resolution, and spatial discrimination along the OA of the third camera. Spatial resolution was comparable to the FPA in three directions: along the two dimensions of the image plane and along the OA. This is depicted in FIG. 15. $P_1$ (solid dot) shown in FIG. 15 is positioned on the OA of Camera 1 but located by some amount inside the plane of best focus, denoted as the Object Plane 1, but within the DOF of Camera 1. Point $P_1$ is at the same time being projected along Object Plane 2 of Camera 2 thereby creating point $P_2$ (open circle). The image of $P_1$ in Camera 1 is see as $P_1'$ (solid dot) and in Camera 2 as $P_2'$ (open circle).

In Camera 1, $P_1'$ remained in the center of Image Plane 1 with little detectable change, whereas $P_2'$ is seen to have shifted by a measurable number of pixels denoted by $\Delta X$. The extent of the shift on Image Plane 2 depends on the physical shift of $P_2$ and by the image magnification dictated by the lens focal length of Camera 2 and the object image conjugate distances of $P_2$ and $P_2'^7$. As such, $P_1$ has three conjugate images, one on each camera (remember there are three cameras in this example). Given that one pixel represented a smallest discernable element in the image planes, $P_1'$ and $P_2'$ was represented as a set of pixel coordinates. Therefore, a given $P_1$ will have a unique set of two dimensional pixel coordinates ($x_p$, $y_p$) in each camera image. Thus using three cameras $P_1$ is specified with a set of 3 pixel coordinates, (x1p, y1p), (x2p,y2p), (x3p,y3p). We linked $P_1$ to a LT such that these pixel coordinates defined a point that was known to the LT, and $P_1$ became a LT probe with spatial resolution of a single pixel.

Example 3

Linking a Pixel to a Laser Tracker

Figure 16:
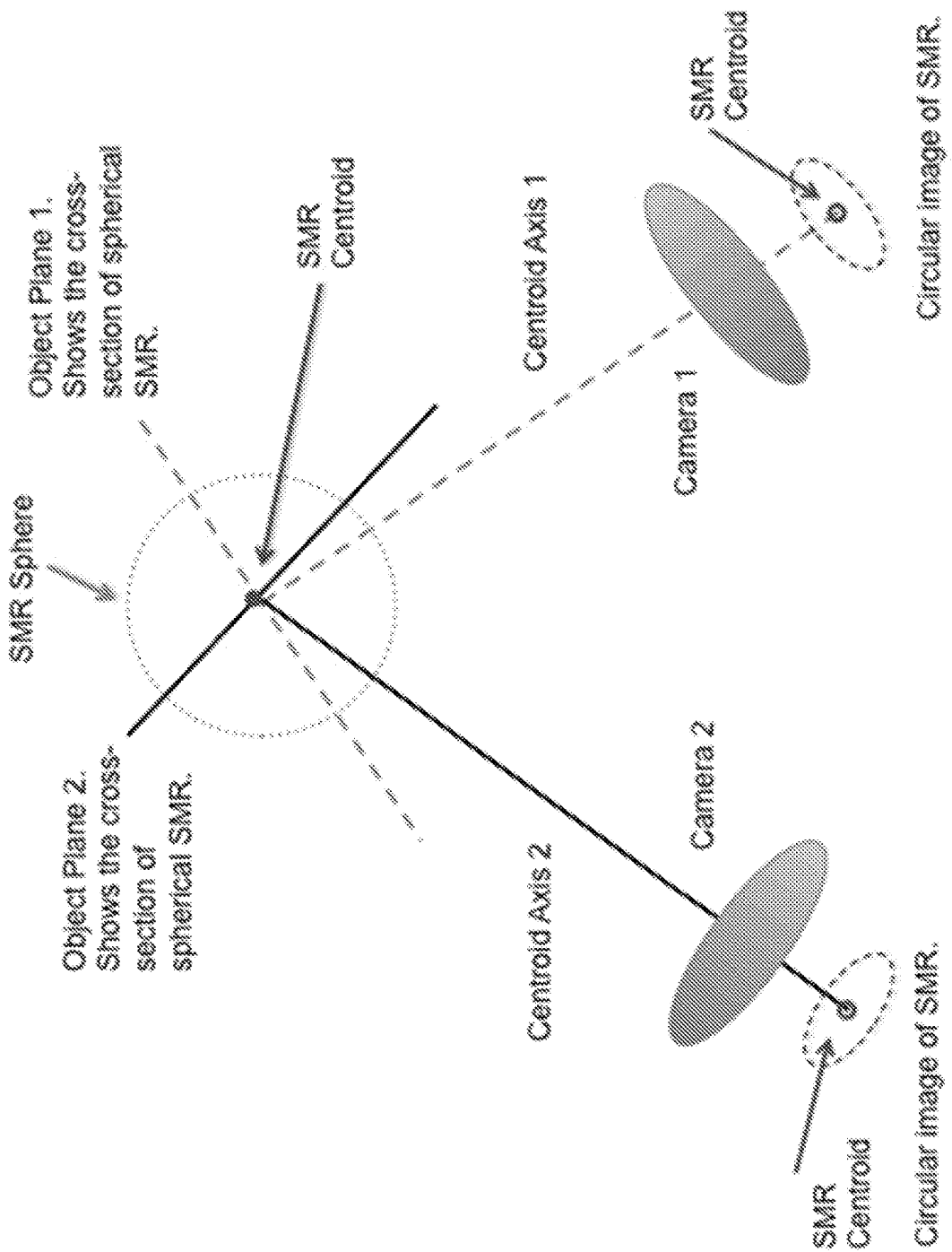
FIG. 16 shows a geometry cameras in a noncontact metrology probe.

Using the principle of projection to the three image planes as was done for the single point $P_1$, a sphere that is imaged by the three cameras will result in three circular images at each of the image planes. Furthermore, the centroid of these three circular images, when projected back to the object plane, are coincident with the 3D center of the sphere. Therefore, just as we were able to assign a unique set of three pixel coordinates to the single point, $P_1$, we assigned a similar set of three pixel coordinates to the centroid of the sphere. As is commonly known, the geometrical center of a spherical mirror reflector (SMR) is also coincident with the location that is measured by the LT to within a nominal alignment of 5 to 10 µm. Because the cameras can identify the sphere center, by projection to the pixel arrays, as well as the LT can, we have a direct way to link the set of pixel coordinates of the sphere center to the LT. This is depicted in FIG. 16, which shows a projection of an SMR that linked the cameras to a laser tracker. The circular images in Camera 1 and 2 that were produced by the projection of the SMR are shown. The centroid of these SMR images coincided with the centroid of the spherical form of the SMR.

Figure 18:
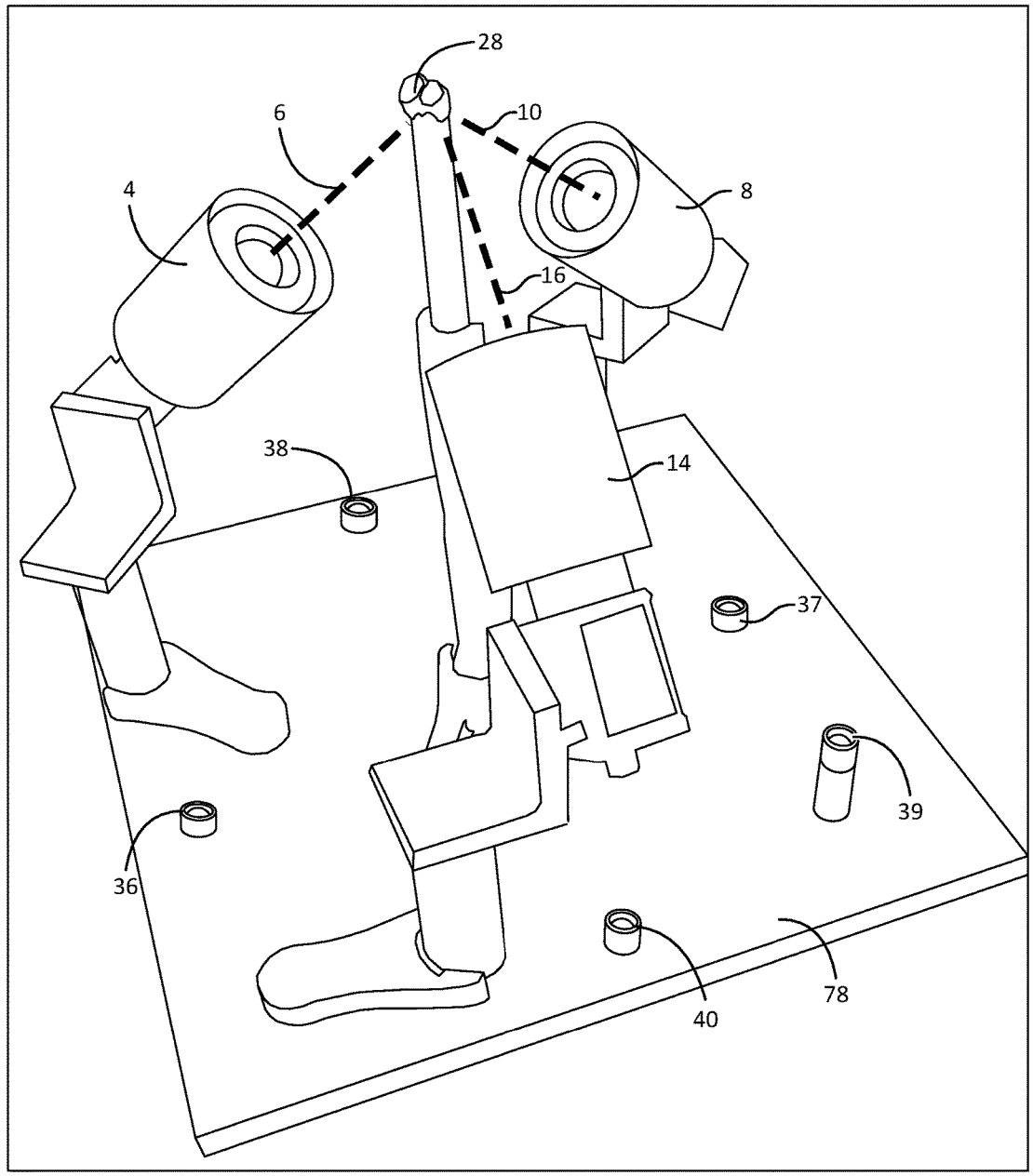
FIG. 18 shows a photograph of a portion of a noncontact metrology probe.

FIG. 18 shows a NMP that included three cameras arranged in a tetrahedral with a constellation of five SMRs fixed in relation to the cameras. The intersection of the optical axis (OA) for each camera to the location of reference member (here a spherical mirror reflector) is shown in FIG. 18. The points captured by the laser tracker representing the constellation of SMRs that was used to locate the NMP in the laser tracker coordinate frame.

Figure 17:
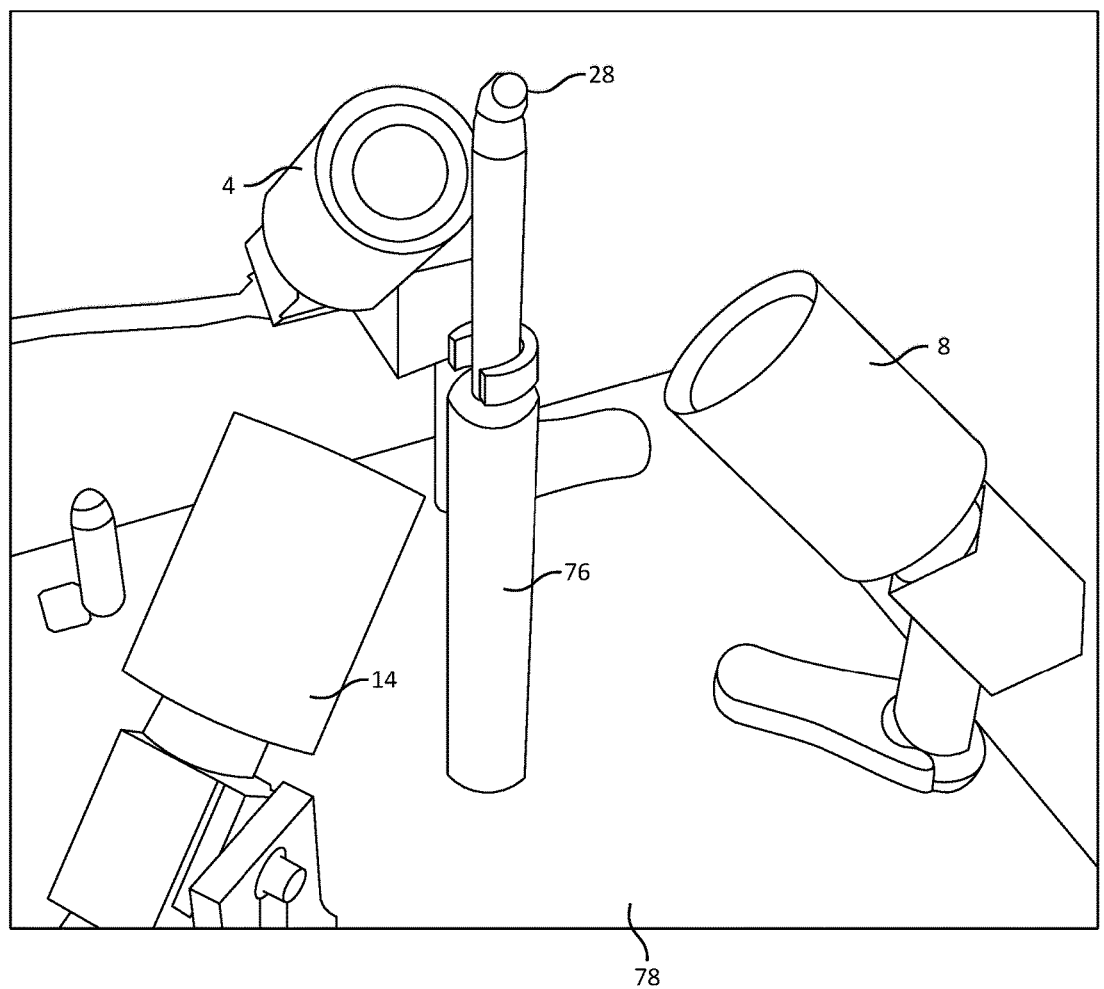
FIG. 17 shows a photograph of a portion of a noncontact metrology probe.
Figure 20:
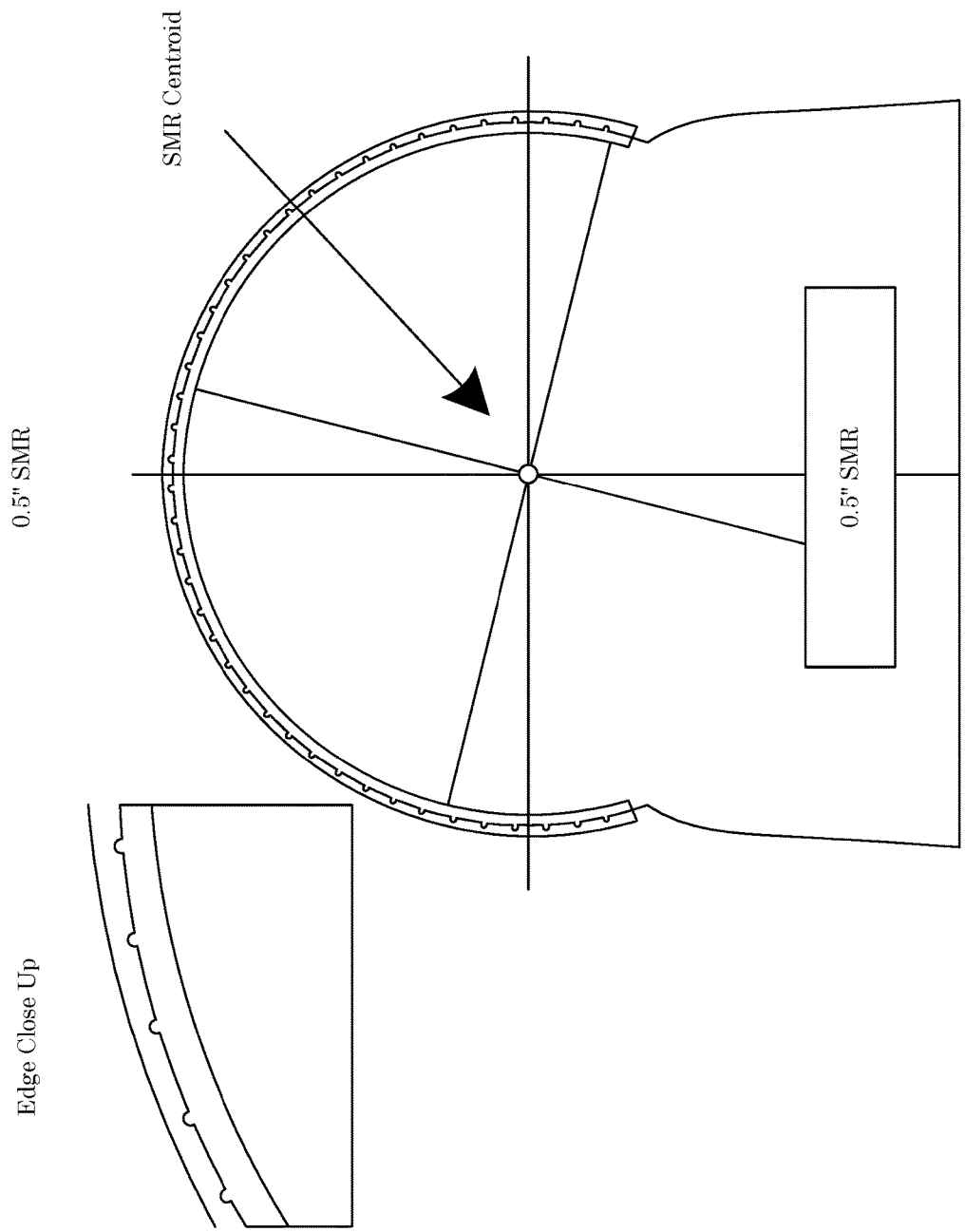
FIG. 20 shows an image of a reference member.

FIG. 19 shows a plurality of centroids corresponding to the reference member and secondary members shown in FIG. 17 and FIG. 18. Here, multiple centroids were generated by establishing a fixed constellation of SMRs relative to the three cameras, one of which (called reference member) is placed in the center of the FOV of the three cameras and plays the role of the sphere described previously. Five other SMRs (secondary members, labelled SMR1, SMR2, SMR3, SMR4, and SMR5) were mounted to the base of cameras, SMR1 through SMR5. To link the laser tracker to a single pixel from each of the cameras, a bright field image of reference member was first captured by each camera (See FIG. 20). A panel of light emitting diodes was used as to generate a Lambertian bright field background and a mat black shroud was placed around reference member and the cameras to stop unwanted reflections off the reflective SMR sphere. An edge detection algorithm was then used to determine the set of pixel coordinates that defined the centroid of reference member. FIG. 20 shows the bright field image of reference member. The cross hairs locate the centroid, the border is the region of interest (ROI) used in the edge detection process. Dots on the perimeter of the SMR and inside the ROI are the location of the edge pixels determined from the edge detection algorithm. These three pixel coordinates were stored in memory and highlighted in the images of the three cameras. Although the entire sphere was not visible due to the SMR nest. Here, FIG. 20 shows a bright field image of a 0.5 inch SMR as seen through the cameras of the NMP. This bright field image is the implementation of the SMR projection depicted in FIG. 16. (Top Left) A close up of the SMR edge is shown. The boundary is the ROI used for the edge detection process. Dots show the location of the pixels at the SMR edge in the bright field. (Center) The centroid of the SMR determined from fitting a circle to the edge pixels is also shown.

While reference member remains in the same position relative to the cameras and the rest of the constellation (SMR1 though SMR5) the LT measured the entire constellation of SMRs. At this moment reference member was removed from the constellation. This is because the centroid of reference member was stored in memory as pixel coordinates, and these coordinates uniquely defined the point in space of the centroid of reference member relative to the rest of the constellation. As such, when a point on an object appears to lie at the same location as the stored centroid pixels in all three cameras simultaneously, then that object occupies the same location as centroid of reference member did. In the NMP, the stored pixels were highlighted in each of the three images. The user then moved the NMP such that these highlighted pixels appear at the same location on the object one is trying to measure. That is, the user is in essence virtually placing the centroid of reference member at a known location on the object of measure. At this moment, the laser tracker then captured the rest of the SMRs in the constellation. Since the constellation has a fixed relationship to the centroid of reference member the location on the object under measure is also know by the LT. In this way, a physical LT target was not used to touch the object we measured. In essence, we created a virtual LT probe that is the size of a single pixel, or about 25 µm in the NMP. In the rest of these Examples, the point in space corresponding to the centroid of reference member is referred to just as reference member. At this time it is worth mentioning that although for this prototype, a constellation of SMRs was used in conjunction with reference member, it would be equally effective to establish a coordinate frame using a six-degree-of freedom LT target that had a fixed relationship to reference member. This would have advantages such as easier tracking ability and quicker measurement time, as the processing of the SMR constellation relationship to reference member might be included. Next, we describe the validation and measurements made with the Noncontact metrology probe.

Example 4

Validation Measurement

Figure 21:
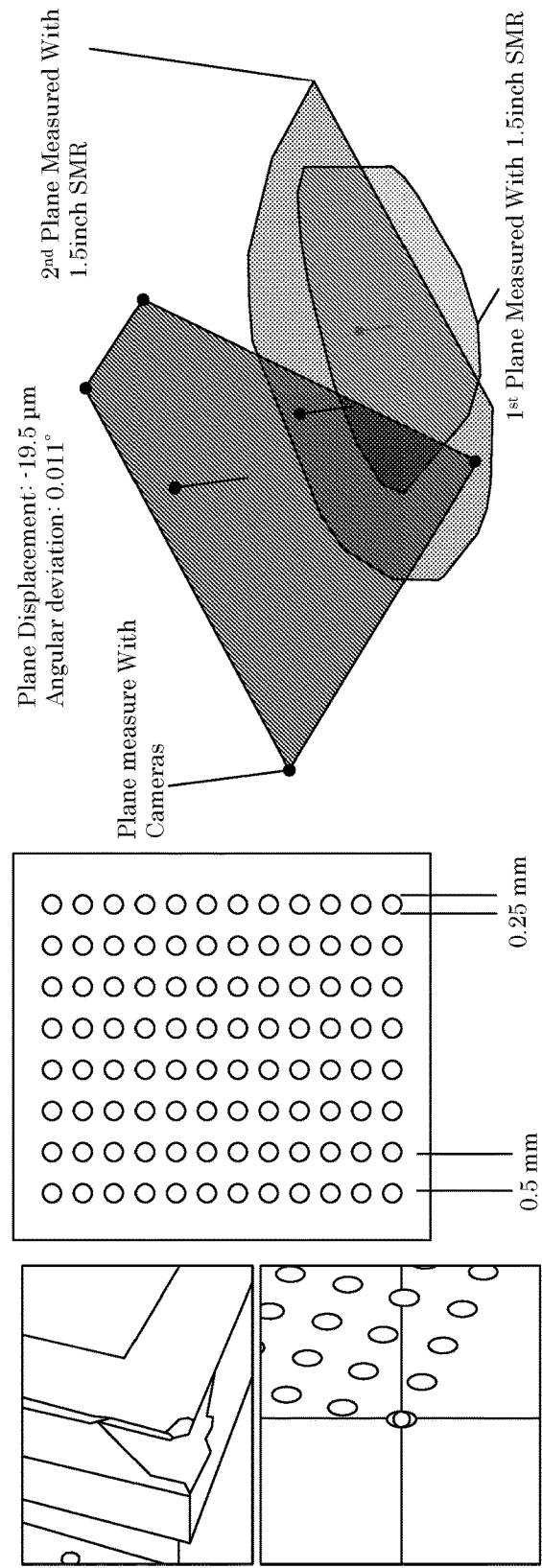
FIG. 21 shows a grid test setup.

A validation measurement was performed to compare the performance of the NMP to a standard 1.5" SMR. A glass 2"×2" plate camera test target grid made of 250-µm-diameter electron-beam-etched chrome dots spaced by 500 µm was used. Since the grid dots are only a few hundred nanometers out of the plane of the glass, the dots were not distinguishable from the plane of the glass using a LT. This allowed for a comparison measurement of the plane of the test target to be made between the SMR and NMP. The dots provided repeatable fiducials for the NMP to measure in the plane of the grid. While the optically flat glass substrate provided a repeatable surface for the SMR to measure. A spatial scan was performed as the SMR was moved along the surface of the glass grid. The NMP was used to measure several dots in the grid. Planes were then fitted to the individual data sets and the displacement and angular deviation of the normal were compared. Two SMR planes were measured and compared to the plane determined by the NMP. This is shown in FIG. 21. The rms fit statistics for the NMP plane was, 0.0021 mm, and the two SMR measured planes 0.0038 mm and 0.0039 mm respectively. This yielded a mean plane offset between the NMP measured plane and SMR measured planes of 19.5 µm, which is in the laser tracker uncertainty. The angular deviation determined was 0.11°.

FIG. 21 shows a grid test target that included a square grid of 0.25 mm diameter chrome dots spaced by 0.5 mm. Full field and zoomed in images of the test target as seen in the NMP images are also shown. In the lower left reference member is located at the blue dot at the intersection of the red cross hairs. FIG. 21 (right panel) shows a visual comparison of planes determined from fits to data from the NMP (blue plane) and the 1" SMR (Red and Green Planes) measurements. A mean plane displacement of 19.5 and mean angular deviation of 0.11° was determined.

Example 5

Measuring Millimeter-Wave Antenna Apertures

Figure 22:
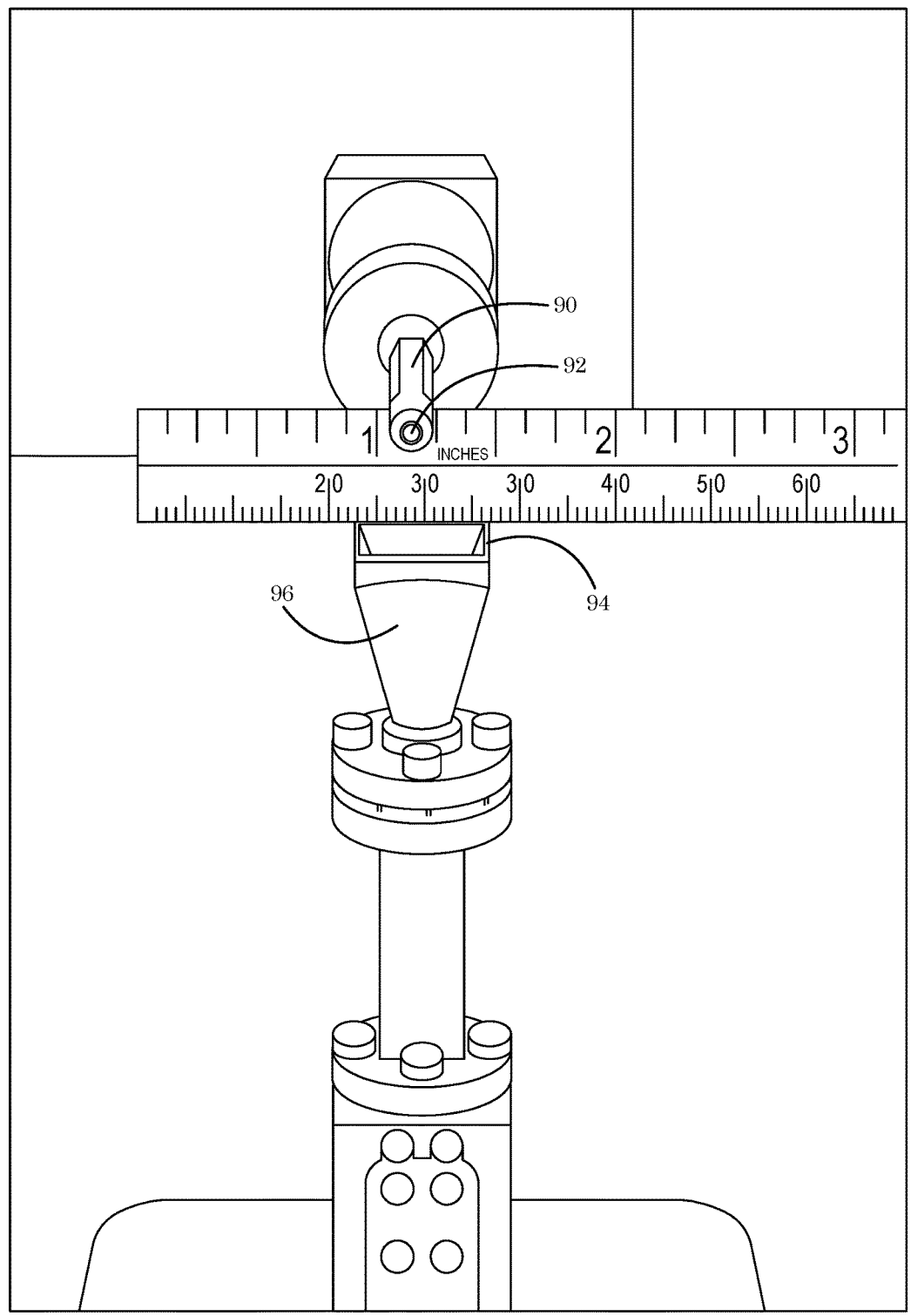
FIG. 22 shows a photograph of object members.

A circular probe antenna and a pyramidal horn antenna with a rectangular opening were measured. These antennas are shown in FIG. 22. The manufacturer specified dimensions for the circular aperture is 1.5 mm diameter and 12.55 mm×9.58 mm for the rectangular aperture. Both of these antennas are gold plated, are defined by sharp edges and quite delicate. For the purposes of antenna metrology, it is important to define a coordinate frame for these antennas based on the plane, center, and orientation of the aperture using an LT. These antennas are typically fixed to a mechanical positioner and tracked with an LT. Therefore, it is also important to know the antenna frame relative to the other LT targets that are used to track the positioner. Recent advances in antenna scanning systems use these antennas as the end effector tool of a robot arm[8]. Having a way to teach the robot the location of the antenna frame (i.e. tool tip frame) was one of the motivating factors in developing the NMP. As these antennas are much smaller than an SMR, and too delicate to touch, and require alignment accuracy of better than 50 µm, currently available methods for tool tip calibration were not suitable. The NMP not only allowed for tool tip calibration through the native robot controller routines, but also allowed for directly measuring the offset between the antenna aperture frame (i.e. tool tip) and a six-degree-of-freedom target or set of SMRs fixed on the robot.

FIG. 22 shows a circular probe antenna with nominal aperture radius of 1.5 mm and pyramidal horn antenna with rectangular aperture of nominal dimensions 12.55 mm×9.58 mm.

Figure 23:
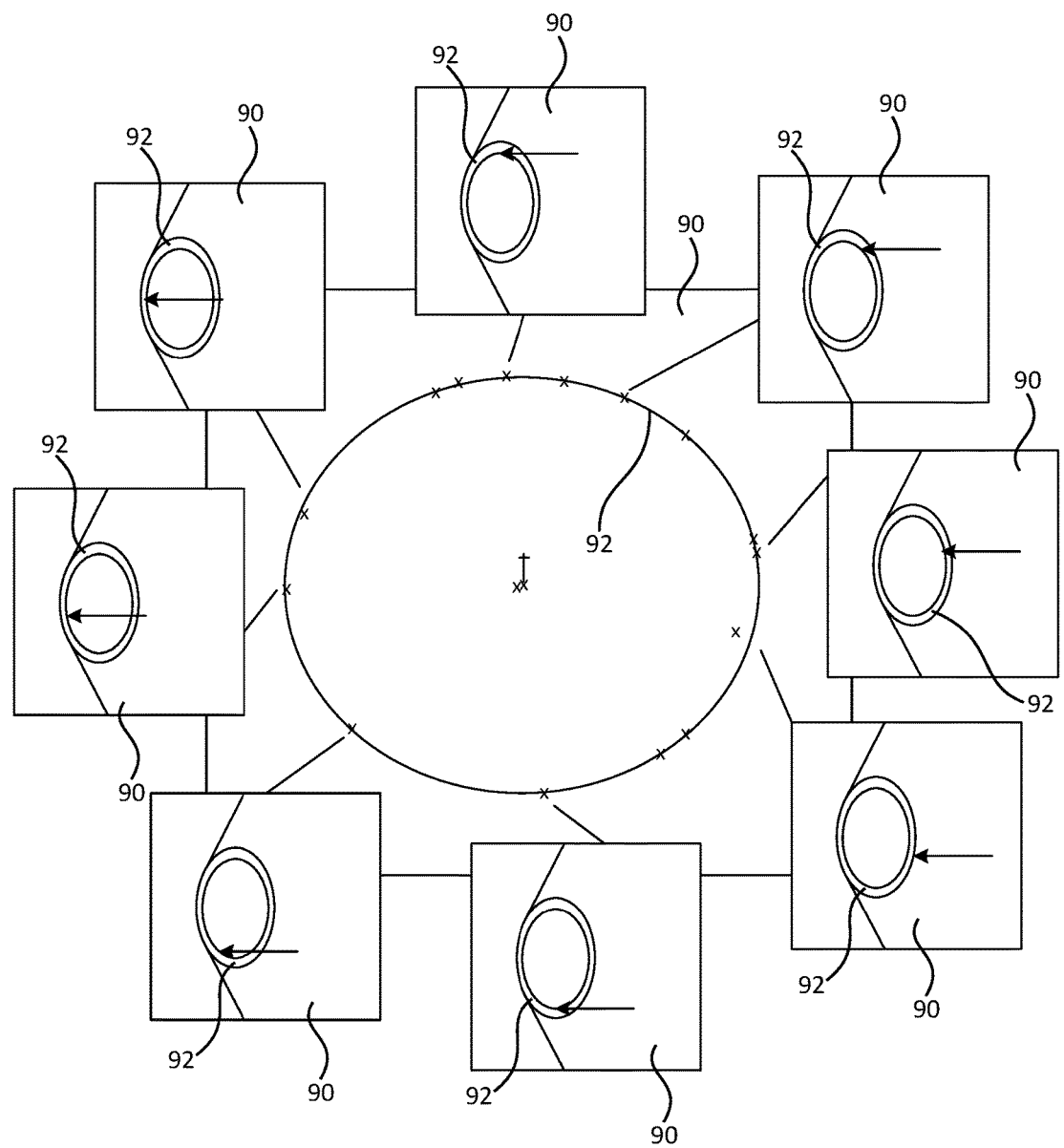
FIG. 23 shows images of an object member.
Figure 25:
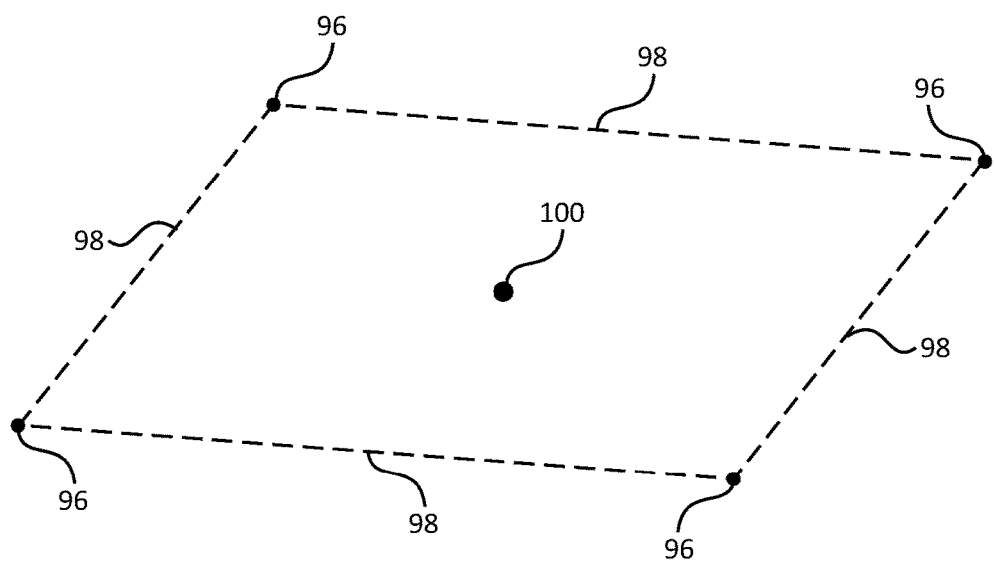
FIG. 25 shows locations of corners, edges, and center of the object member shown in FIG. 24
shows images of an object member.

The NMP was used to trace out the edges of these antenna apertures. Geometries were then fitted to determine the center, plane, and orientation of each antenna aperture. FIG. 23 and FIG. 25 show the NMP measurements and the fitted geometry for the circular probe and pyramidal horn respectively. The circular aperture of the probe antenna was measured at 15 locations around the perimeter. These data were then fitted to a circle to determine the plane and diameter of the aperture. The circle fitting resulted in a diameter of 1.486 mm with an rms fit error of 22 µm. This is consistent with the manufacturer specifications of a 1.5 mm diameter aperture. The center and plane of this circle were used to define the coordinate frame of the probe antenna. The orientation of this frame in the plane of the circle was left arbitrary until an electrical alignment referenced to the plane of electric-field polarization to the test antenna was later performed.

The four corners of the pyramidal horn aperture were measured to determine the aperture dimensions. A rectangle was then fitted to these corners. A coordinate frame for the aperture was then defined in the plane of the rectangle and clocked to the short end of the rectangle. FIG. 25 shows the measurement of the four corners and the resulting coordinate frame. The dimensions of the rectangular aperture determined from these measurements was 12.65 mm×9.68 mm×12.63 mm×9.68 mm with a fit error of ≈20 µm, which is in good agreement with the manufacturer specifications of 12.55 mm×9.58 mm.

FIG. 23 shows, in the center of figure, the circle that was fitted to measurements made with the NMP around the perimeter of the antenna aperture. Data points lie along this fitted circle. At each measurement location, an inset photo of the aperture as seen with the NMP is shown. In each inset, photo an arrow points to locations on the aperture where the NMP obtained measurements. FIG. 22 shows a photo of the circular probe antenna. A ruler is also shown for scale. The diameter of this antenna aperture determined from the NMP measurements was 1.486 mm with an rms fit error of 22 µm.

Figure 24:
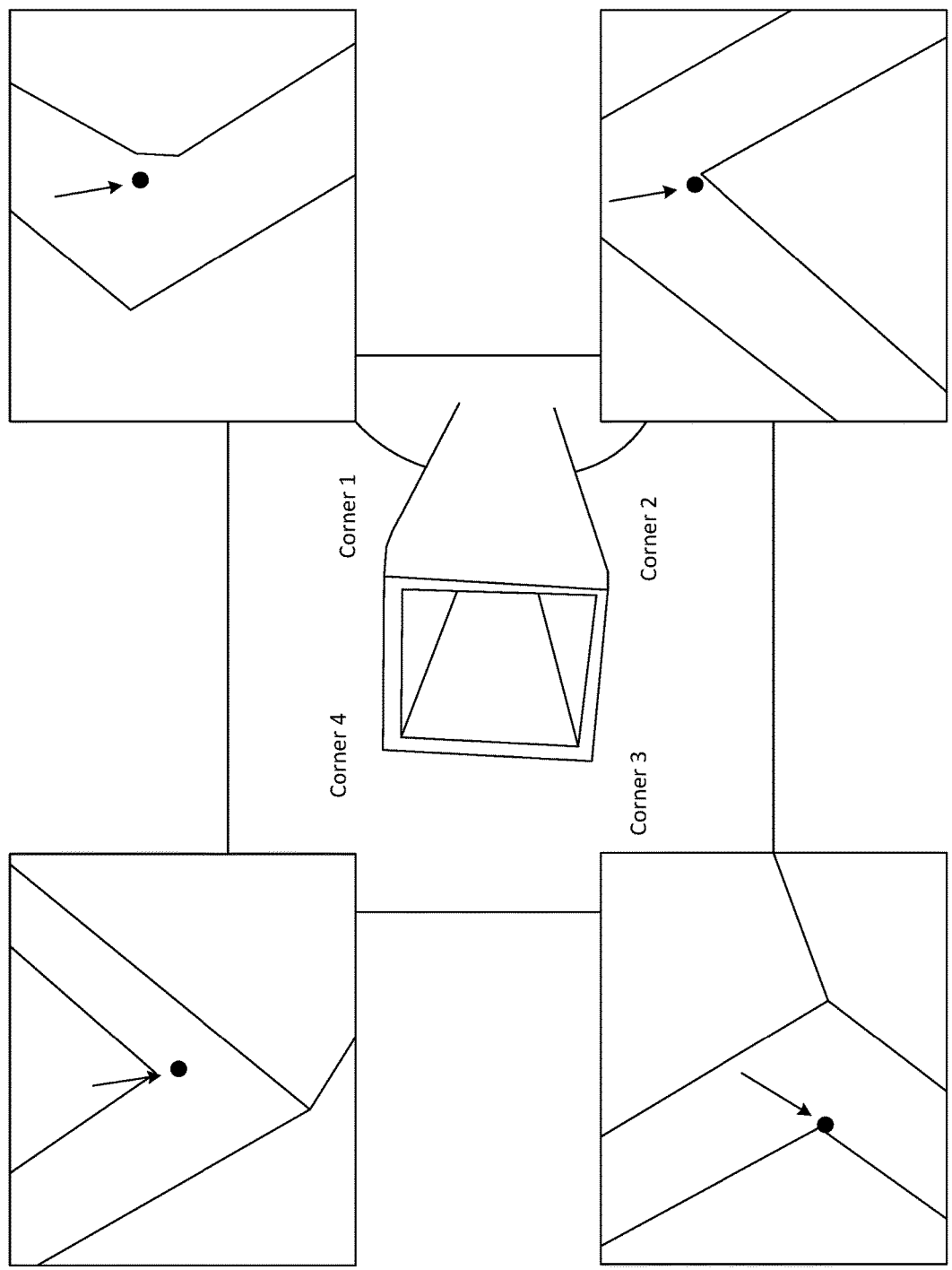
FIG. 24 shows images of an object member.

FIG. 24 shows corners of the pyramidal horn antenna measured with the NMP. Arrows point to dots, which provide the locations at which the corners 1,2,3,4 were measured. FIG. 25 shows a coordinate frame generated using these corners. The dimensions of aperture were determined to be 12.65 mm×9.68 mm×12.63 mm×9.68 mm with a fit error of ≈20 µm.

Example 6

Measuring Transparent and Soft Objects with the NMP

The imaging and non-contact measuring capability of the NMP provided for soft material to be measured with the NMP without deforming the object. Furthermore, the imagining capability allowed for objects constructed of weak albedo (low optically reflecting) material to be measured. We demonstrated this by measuring two objects with these attributes. First, measurements to determine the shrink ratio of clear Heat Shrink® (commercially available form of material with biaxial asymmetric coefficient of thermal expansion) before and after shrinkage were made. Second, the geometry of a man made spider web constructed from strands of clear epoxy was measured. This spider web is an extreme case of an object with these attributes and that is not easily measured with a LT, but that can be routinely measured with the NMP.

Figure 26:
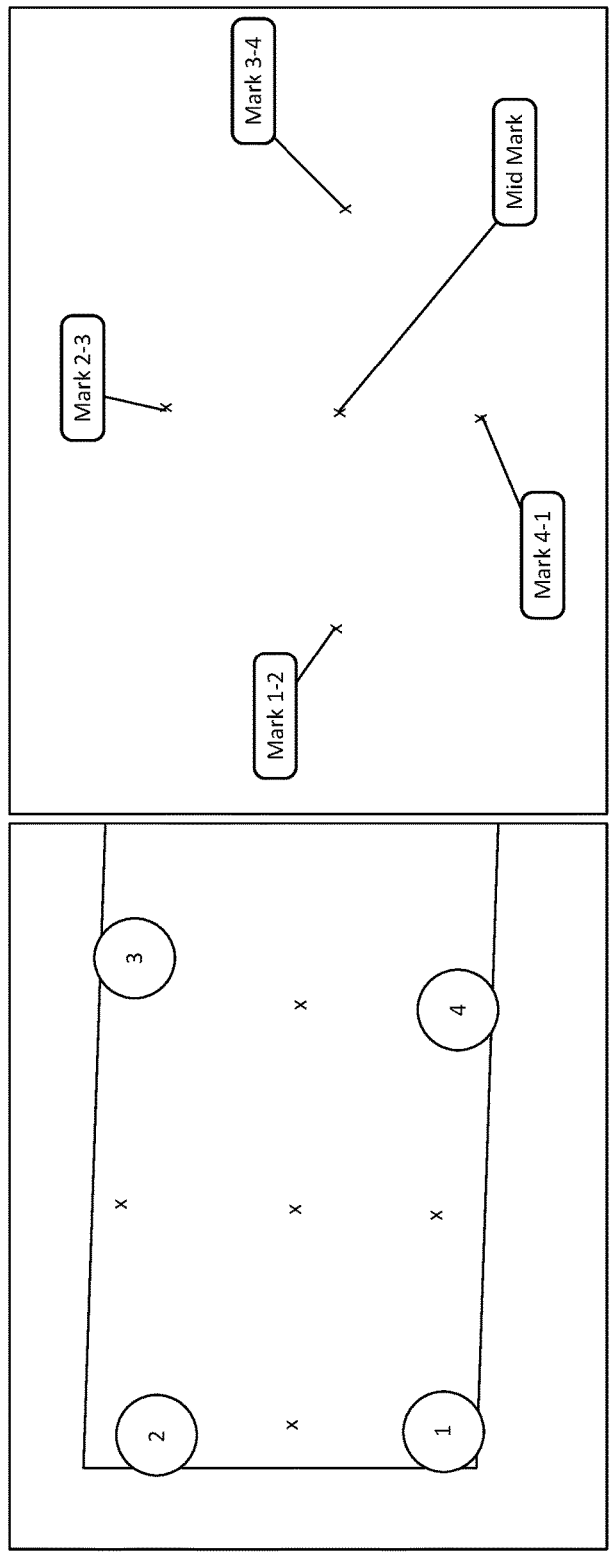
FIG. 26 shows a photograph of an object member and marks on the object member.

The shrink ratio of the material we used was 2:1 such that it should shrink twice as its original size. However Heat Shrink® is anisotropic in its shrinking behavior, such that it is designed to shrink only in one direction according to the specified shrink ratio, and not shrink in the orthogonal direction. A tube of Heat Shrink® was cut lengthwise to form a rectangle and fixed to a foam board with thumbtacks. Prior to shrinking a permanent marker was used to mark the Heat Shrink® along the direction of least shrinkage and most shrinkage. FIG. 26 (Left) shows the Heat Shrink® fixed to the foam board with thumbtacks prior to shrinking. The thumbtacks were numbered 1 through 4 to avoid accidental confusion with the orientation of Heat Shrink® during measurement. FIG. 26 (Right) shows the measured marks with the NMP prior to shrinking They are labeled Mark 1-2, 2-3, 3-4, 4-1 and Mid Mark for the thumbtacks they lie between. Because the Heat Shrinks® was meant for use as wire sheathing the non-shrinking direction was taken as along the direction of the tube prior to cutting. Using the NMP the separation between marks 2-3 and the mid mark and, 3-4 and the mid mark was measured to be 18.74 mm and 21.77 mm respectively. After shrinking the separation of these marks measured to be 6.89 mm and 22.67 mm. This gave a shrink ratio in the two directions of 2.77 and 0.96. This shows anisotropic shrinkage a bit larger than a 2:1 ratio. As a heat gun was used to shrink the material, the temperature applied was not as controlled as may be required by the manufacturer. This may be the biggest reason for the discrepancy between in the measured shrink ratio to the specified one.

FIG. 26 shows a piece of clear Heat Shrink® fixed to foam board with thumbtacks. Marks were used to determine shrink ratio are shown. Numbered thumbtacks were visible. The right panel of FIG. 26 shows NMP spatial data for the Heat Shrink®.

Figure 27:
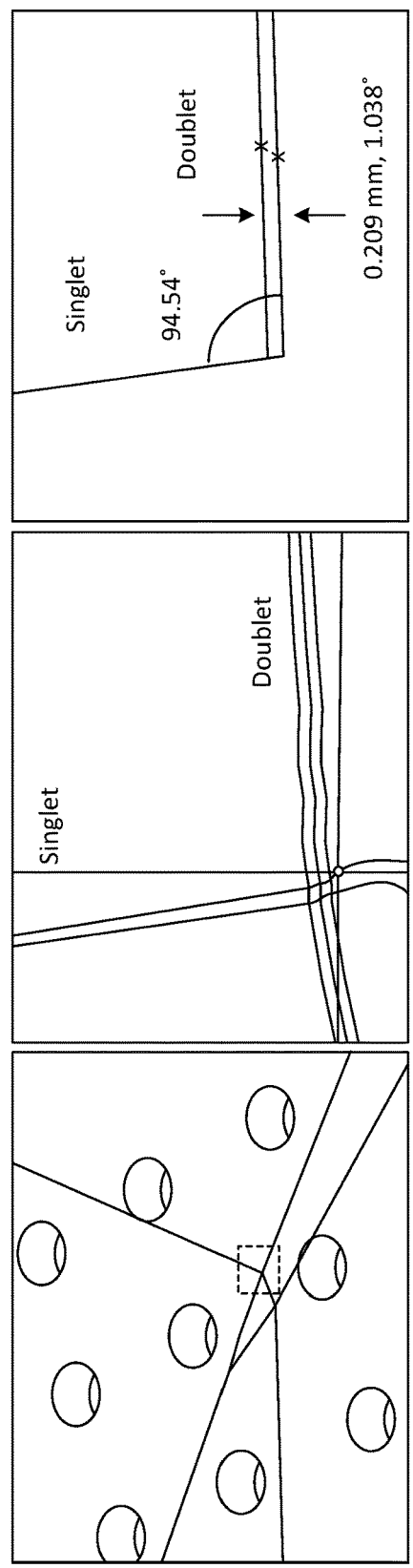
FIG. 27 shows images of an object member.

FIG. 27 shows (left panel) a photograph of the spider web made from stands of clear epoxy. ¼-20 holes on 1" centers in the optics breadboard supporting the web are also visible in the background. Within the dotted box lies the junction of web strands that were measured with the NMP. The middle panel of FIG. 26 shows a close-up image through the NMP of the web strands. Cross hairs mark the location of the reference member pixel. Singlet and doublet strands were identified to be measured. The right panel of FIG. 26 shows a spatial data plot for the geometry of the singlet and doublet strands.

The spider web was supported by metal posts screwed to a small optical breadboard that had ¼-20 tapped holes on 1" centers. The web was measured at several locations along strands and at the points of strand intersection. The dotted box in FIG. 27 (Left) shows the region of the web measured using the NMP. FIG. 27 (Center) shows the close up view through the NMP. The intersection of the red crosshairs marked the location of the reference member pixel. A singlet and doublet set of strands were identified to be measured. From these data the geometry of the spider web was determined, and the separation of the members of the doublet was determined as well as the angle made between the singlet and doublet. The angle between individual doublet members was determined to be 1.038° with a mean separation distance of 0.209 mm. The mean angle between the singlet and doublet was determined to be 94.54°. This is shown in the right panel of FIG. 27.

Example 7

Linking Machine Vision Derived Geometries to a Laser Tracker

Figure 28:
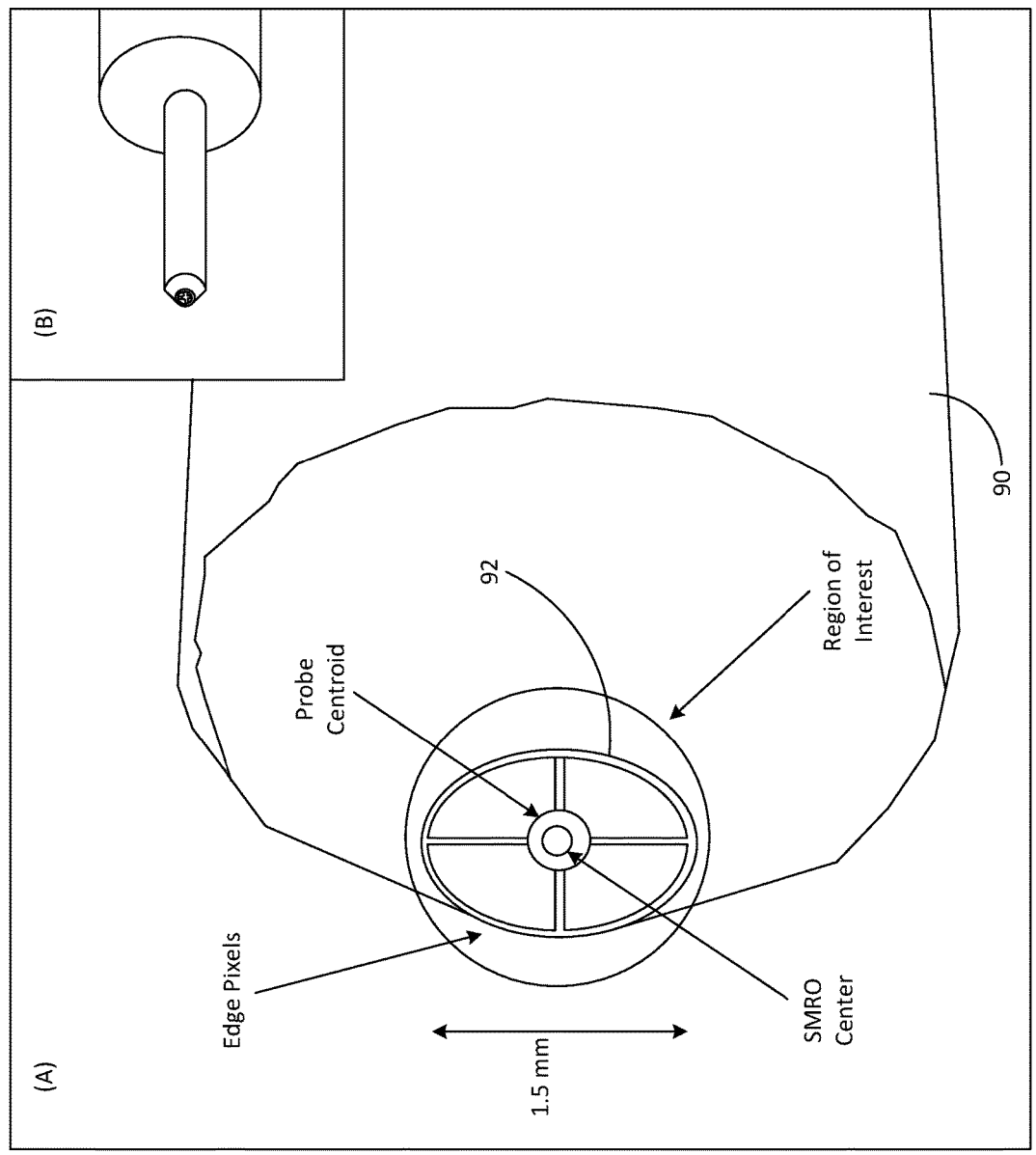
FIG. 28 shows images of an object member.
Figure 29:
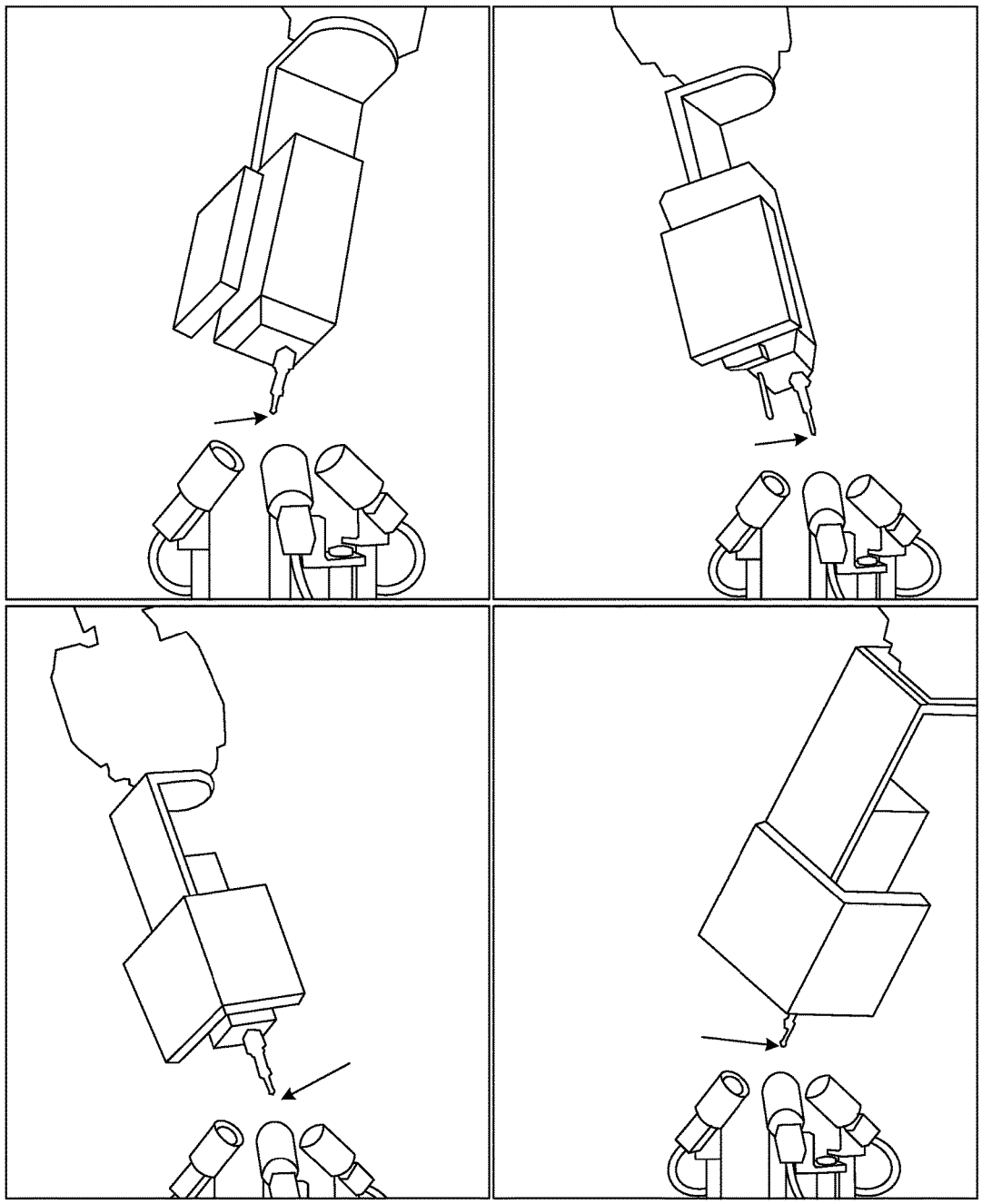
FIG. 29 shows photographs of a noncontact metrology probe and object member.

Using the NMP, geometries that are derived from machine vision were directly linked to the LT. An example of this is given for the circular antenna probe aperture in FIG. 28. In FIG. 28, a region of interest (ROI) was defined in the images of the NMP around the circular aperture. An edge detection algorithm was then applied within the ROI to find the edge of the aperture. An ellipse-fitting algorithm was then used to find the center of the aperture. Once the ellipse center was determined, the reference member point in the NMP image was then placed at the same location as the ellipse centroid. At this moment, the centroid of the ellipse was now linked to the LT. FIG. 28 shows one image from the NMP depicting this process. The ROI is shown as the green boarder. The red boarder is made of highlighted pixels that were determined from the edge detection algorithm. These pixels define the edge of the aperture and were used to fit the ellipse. The red cross hairs are the major and minor axis of the ellipse. The yellow circle is the fitted ellipse centroid. The blue circle is the location of reference member from the NMP. When the blue circle and yellow circle overlap in the NMP images then the location of reference member and the centroid of the ellipse were in the same location in space. At this moment, the ellipse centroid became linked to the LT. Furthermore, the error in the alignment between the yellow and blue circles was determined in real-time from calculating the pixel offset from the center of each circle. Although we have not deliberately calibrated how this pixel offset error translates into X,Y,Z errors in the LT frame, we envision a volumetric calibration could be performed to provide X,Y,Z tacking of alignment errors and is the topic of future work. This would allow direct tracking of errors between the NMP reference member point and machine vision derived geometries. An application of this technique is for non-contact robot TCP calibration. This technique was used at the NIST Configurable Robotic Millimeter-Wave Antenna (CROMMA) Facility[7] to teach the robot arm the location of the center of the circular probe antenna aperture end effector. The robot arm was driven to five different poses, such that for all poses the TCP remained at the same point in space. This point in space was defined using the reference member point of the NMP. For each pose of the robot arm, the center of the circular probe aperture was determined using the edge detection and ellipse fitting algorithms just described. The robot was driven such that the center (yellow circle) of the fitted ellipse was aligned to the reference member point (blue circle) in the NMP just as is shown in FIG. 28. FIG. 29 shows the robot arm of the CROMMA in four of the five robot poses used to teach the robot controller the TCP location.

FIG. 28a shows a close up image of circular probe antenna, and FIG. 28b shows a full field view. Edge detected pixels, circular probe centroid, reference member center, and region of interest are shown.

FIG. 29 shows the robotic arm in the CROMMA facility. The NMP was mounted to a tripod while the robot arm was driven to the four poses FIG. 29(a)-(d) used for the TCP teach process. The circular probe antenna was the robot end effector. Only four poses are shown for brevity. White arrows point to the end of the antenna that was co-located with the reference member point of the NMP during the TCP calibration process.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A noncontact metrology probe comprising:
   a first camera comprising a first field of view;
   a second camera comprising a second field of view and arranged such that the second field of view overlaps the first field of view to form a prime focal volume;
   a third camera comprising a third field of view and arranged such that the third field of view overlaps the prime focal volume to form a probe focal volume;
   a tracker comprising:
      a tracker field of view; and
      an optical detector that provides the tracker field of view such that the tracker determines a location of the probe focal volume in the tracker field of view; and
   a plurality of secondary members disposed proximate to the first camera and the second camera in the tracker field of view and arranged for the tracker to determine a location of the secondary members.

2. The noncontact metrology probe of claim 1, further comprising a reference member disposed in the probe focal volume.

3. The noncontact metrology probe of claim 2, wherein the reference member comprises a light reflector, a light emitter, a light blocker, a light filter, or a combination comprising at least one of the foregoing.

4. The noncontact metrology probe of claim 3, wherein the reference member is the light reflector that comprises a spherical mirror reflector.

5. The noncontact metrology probe of claim 1, wherein the secondary members independently comprise a light reflector, a light emitter, a light blocker, a light filter, or a combination comprising at least one of the foregoing.

6. The noncontact metrology probe of claim 1, wherein the secondary members independently comprise a spherical mirror reflector, a six-degree-of-freedom tracker target, or a combination comprising at least one of the foregoing.

7. The noncontact metrology probe of claim 6, further comprising a plurality of pixel coordinates for a location of a centroid of the probe focal volume.

8. The noncontact metrology probe of claim 1, further comprising an object member disposed in the probe focal volume.

9. The noncontact metrology probe of claim 8, wherein the object member comprises a size less than 10 µm.

10. The noncontact metrology probe of claim 8, wherein the noncontact metrology probe determines a property of the object member comprising:
    a location;
    an orientation;
    a size; or
    a combination comprising at least one of the foregoing in an absence of contact between the object member and the first camera, the second camera, the third camera, and the tracker.

11. The noncontact metrology probe of claim 10, wherein the noncontact metrology probe determines the location or the size of the object member to an accuracy of less than or equal to 1 µm.

12. The noncontact metrology probe of claim 11, wherein the noncontact metrology probe determines the orientation and the location of the object member in six degrees of freedom.

13. The noncontact metrology probe of claim 8, wherein the noncontact metrology probe provides determination of a centroid of the object member, detection of an edge of the object member, determination of a location of a fiducial disposed on the object member, inspection of the object member, or a combination comprising at least one of the foregoing.

14. The noncontact metrology probe of claim 8, wherein the noncontact metrology probe provides determination of an absolute alignment of the object member with respect to an auxiliary member disposed in a location relative to the secondary members.

15. The noncontact metrology probe of claim 1, wherein the first camera, the second camera, and the third camera are tetrahedrally disposed to a reference member.

16. A process for calibrating a noncontact metrology probe, the process comprising:
    providing a noncontact metrology probe comprising:
       a first camera comprising a first field of view;
       a second camera comprising a second field of view;
       a third camera comprising a third field of view; and
       a tracker comprising a tracker field of view and an optical detector that provides the tracker field of view;
    overlapping the first field of view with the second field of view to form a prime focal volume;
    overlapping the prime focal volume with the third field of view to form a probe focal volume; and
    overlapping the tracker field of view with the probe focal volume to calibrate the noncontact metrology probe.

17. The process of claim 16, further comprising:
    providing a reference member in the probe focal volume;

acquiring a first in of the reference member by the first camera;
acquiring a second image of the reference member by the second camera;
acquiring a third image of the reference member by the third camera;
determining a plurality of first pixel coordinates of a feature of the reference member from the first image;
determining a plurality of second pixel coordinates of the feature of the reference member from the second image;
determining a plurality of third pixel coordinates of the feature of the reference member from the third image; and
determining a reference centroid of the feature of the reference member from the first pixel coordinates, the second pixel coordinates, and the third pixel coordinates.

18. The process of claim 17, further comprising:
disposing a plurality of secondary members proximate to the first camera and the second camera in the tracker field of view;
acquiring, by the tracker, individual locations of the secondary members; and
referencing the reference centroid to the individual locations.

19. The process of claim 18, further comprising:
disposing an object member at an arbitrary location with respect to the reference centroid;
acquiring a first image of the object member by the first camera;
acquiring a second image of the object member by the second camera;
acquiring a third image of the object member by the third camera;
determining a plurality of first pixel coordinates of the object member from the first image;
determining a plurality of second pixel coordinates of the object member from the second image;
determining a plurality of third pixel coordinates of the object member from the third image;
determining an object centroid of the object member at the arbitrary location from the first pixel coordinates of the object member, the second pixel coordinates of the object member, and the third pixel coordinates of the object member; and
referencing the object centroid to the individual locations of the secondary members to determine a first location of the object member relative to the reference centroid.

20. The process of claim 19, further comprising:
moving the object member from the arbitrary location to a second location;
determining the object centroid of the object member at the second location;
referencing the object centroid of the object member at the second location to the individual locations of the secondary members to determine the second location of the object member relative to the reference centroid; and
tracking movement of the object member by comparing the first location to the second location.

21. The process of claim 19, further comprising moving the object member from the arbitrary location to a third location,
wherein the object centroid overlaps the reference centroid at the third location.

22. The process of claim 16, wherein the feature comprises an edge of the reference member.

* * * * *